US008175904B2

(12) United States Patent
Templeton

(10) Patent No.: US 8,175,904 B2
(45) Date of Patent: May 8, 2012

(54) METHOD AND APPARATUS FOR INTERMEDIATION OF MEETINGS AND CALLS

(76) Inventor: Bradley S. Templeton, Cupertino, CA (US)

( * ) Notice: Subject to any disclaimer, the term of this patent is extended or adjusted under 35 U.S.C. 154(b) by 559 days.

(21) Appl. No.: 09/416,278

(22) Filed: Oct. 14, 1999

(65) Prior Publication Data

US 2003/0191676 A1 Oct. 9, 2003

Related U.S. Application Data

(60) Provisional application No. 60/104,255, filed on Oct. 14, 1998.

(51) Int. Cl.
G06F 17/60 (2006.01)
(52) U.S. Cl. ...................... 705/7.12; 705/7.13
(58) Field of Classification Search ................. 705/7, 8, 705/9, 7.11, 7.12; 709/204, 205, 206, 207
See application file for complete search history.

(56) References Cited

U.S. PATENT DOCUMENTS

| | | | | |
|---|---|---|---|---|
| 4,220,821 A * | 9/1980 | Lucas | ............................ | 370/431 |
| 4,313,035 A | 1/1982 | Jordan et al. | ..................... | 179/18 |
| 5,263,084 A | 11/1993 | Chaput et al. | ................. | 379/215 |
| 5,299,260 A * | 3/1994 | Shaio | ........................ | 379/266.07 |
| 5,515,426 A * | 5/1996 | Yacenda et al. | ......... | 379/201.07 |
| 5,544,237 A * | 8/1996 | Bales et al. | .............. | 379/205.01 |
| 5,559,876 A | 9/1996 | Alperovich | .................... | 379/205 |
| 5,596,634 A | 1/1997 | Fernandez et al. | ............ | 379/201 |
| 5,621,789 A | 4/1997 | McCalmont et al. | .... | 379/265.01 |
| 5,625,407 A * | 4/1997 | Biggs et al. | ................. | 348/14.11 |
| 5,646,988 A | 7/1997 | Hikawa | ..................... | 379/266.01 |
| 5,652,789 A | 7/1997 | Miner et al. | ................... | 379/201 |
| 5,661,788 A | 8/1997 | Chin | ............................. | 379/142 |
| 5,724,412 A | 3/1998 | Srinivasan | ................. | 379/93.23 |
| 5,758,079 A | 5/1998 | Ludwig et al. | ........... | 395/200.34 |
| 5,764,639 A | 6/1998 | Staples et al. | ................. | 370/401 |
| 5,768,359 A | 6/1998 | DiPierro, Jr. et al. | ......... | 379/209 |
| 5,768,513 A | 6/1998 | Kuthyar et al. | .......... | 395/200.34 |
| 5,784,438 A | 7/1998 | Martinez | ......................... | 379/89 |
| 5,805,587 A | 9/1998 | Norris et al. | .................. | 370/352 |

(Continued)

FOREIGN PATENT DOCUMENTS

EP 0 557 777 A1 2/1992

(Continued)

OTHER PUBLICATIONS

"Mirabilis Announces Special Version of its Popular ICQ to Support NetMeeting 2.0", ICQ Press Center, Apr. 28, 1997 [retrieved on Jun. 4, 2003], 1 page, Retrieved from: http://www.icq.com.*

(Continued)

Primary Examiner — Beth V Boswell
Assistant Examiner — Ernest A Jackson
(74) Attorney, Agent, or Firm — Peters Verny, LLP

(57) ABSTRACT

A computer-implemented method and system for assisting in the intermediation of realtime meetings, including telephone calls and face to face meetings. A user informs his system that he wishes to, for example, make a telephone call. The system sends a request for a realtime meeting to the specified target. Both the target and the requester queue the request. When both the requester and the target are mutually available, the realtime meeting can take place. Some embodiments cause this to happen automatically, some prompt the user to take action, such as dialing the telephone.

38 Claims, 16 Drawing Sheets

U.S. PATENT DOCUMENTS

| | | | | |
|---|---|---|---|---|
| 5,809,128 | A | | 9/1998 | McMullin ................ 370/215 |
| 6,002,760 | A | * | 12/1999 | Gisby ................ 379/266.01 |
| 6,044,146 | A | * | 3/2000 | Gisby et al. ............ 379/266.02 |
| 6,125,178 | A | * | 9/2000 | Walker et al. ............ 379/211.01 |
| 6,230,287 | B1 | * | 5/2001 | Pinard et al. ............ 379/265.09 |
| 6,269,159 | B1 | * | 7/2001 | Cannon et al. ........... 379/202.01 |
| 6,272,216 | B1 | * | 8/2001 | Vaios ................ 379/265.01 |
| 6,330,243 | B1 | * | 12/2001 | Strandberg ................ 370/396 |
| 6,389,127 | B1 | * | 5/2002 | Vardi et al. ............... 379/201.07 |
| 6,418,214 | B1 | * | 7/2002 | Smythe et al. ........... 379/202.01 |

FOREIGN PATENT DOCUMENTS

| | | | |
|---|---|---|---|
| EP | 0 539 105 | A2 | 4/1993 |
| EP | 0 755 144 | A2 | 1/1997 |
| EP | 0 863 650 | A2 * | 9/1998 |
| WO | WO 98/16045 | * | 4/1998 |
| WO | WO 98/21870 | | 5/1998 |

OTHER PUBLICATIONS

Bannan, Karen, "An Internet Doorbell", ICQ Press Center, Feb. 10, 1997 [retrieved on Jun. 4, 2002], 1 page, Retrieved from: http://www.icq.com.*

Ibrahim, Ahbul Zailani Begum Mohamed, "Communicating in real-time on-line", New Straits Times, Nov. 6, 1997 [retrieved on May 31, 2002], 4 pages, Retrieved from: Proquest Direct.*

"E.T. Surf Home", ICQ Press Center, Nov. 15, 1996 [retrieved on Jun. 4, 2002], 3 pages, Retrieved from: http://www.icq.com.*

Noles, Geoffrey, "ICQ offers a revolution in peer-to-peer Internet Communications", elementK Journals, Jul. 1997 [retrieved on Jun. 4, 2002], 5 pages, Retrieved from: http://www.elementkjournals.com/.*

Microsoft NetMeeting, "Microsoft NetMeeting 2.0: Overview and Frequently Asked Questions", Microsoft Corporation, Jul. 15, 1997 [retrieved on May 29, 2002], 9 pages, Retrieved from: http://msdn.microsoft.com/.*

ICQ, screenshots: www.icq.com, Feb. 12, 1998 [retrieved Apr. 15, 2004], pp. 1-38, retrieved from: archive.org and google.com.*

Weber, Thomas E., "Net Interest", Asian Wall Street Journal, Aug. 12, 1997 [retrieved Jan. 22, 2002], 3 pages, retrieved from: Proquest Direct.*

ICQ Press Center, "ICQ for Windows 95", www.icq.com/press/press_release6.html, Jan. 14, 1997 [retrieved Jan. 22, 2002], pp. 1-2, retrieved from: Google.com.*

John Silling, entitled "CTI, Piece by Piece," *Byte Magazine*, Feb. 1987, pp. 85-90.

Michael Nadeau, entitled "Tools for Telephony Apps," *Byte Magazine*, Feb. 1997, six-page document.

S.Foo, C.K. Yeo, S.C. Hui, "A telephone adapter for Internet telephony systems," *Microprocessors and Microsystems* 21 (1997), pp. 213-221.

"Tools of the well-equipped telecommuter—OfficeLink by Teltone," Copyright © 1997, Teltone Corporation, two-page document.

Russell Kahan, entitled "Teleconnect's Call Center Goes Online: Phase II," *Teleconnect*, Aug. 1997, pp. 28 and 29.

Unknown author, "Webley Systems' Virtual Secretary," *Teleconnect* Nov. 1997, p. 20.

Teleco's Perfect Voice Office in *Teleconnect*, Sep. 1997, pp. 105, 106 and 108.

Lyle Deixler, entitled "Automated Attendants—These Robots Receptionists Can Really Ring Your Chimes," *Teleconnect*, May 1997, 14-page document.

Elaine Rowland, entitled "Unify and Simplify, PC-Access to your Voicemail: In the Office, On the Road," *Teleconnect*, Sep. 1998, six-page document.

Unknown author, "Callback Products, Platforms and Services," *Teleconnect*, Sep. 1997, pp. 120-127.

Unknown author, "Apex' Omnivox 3.0.1 For NT. A Grown-UP GUI With Multipoint," *Teleconnect*, Jul. 1997, two-page document.

"Instant Messaging Growing Into Workplace Staple," by NewsEdge Corp, *Dallas Morning News*, via First! by NewsEdge Corp., Oct. 7, 1999, pp. 1-4.

A Stephen Lankton, entitled "Go Inside-ICQ: Reaches Out and Touches Someone!," Copyright © 1997 Go Inside, http://goinside.com/97/1/icq.html, six-page document.

Author unknown, "ICQ Inc.—(I SEEK YOU)—What is it?—What is ICQ?," Copyright © 1998 ICQ, Inc., http://www.icq.com/products/whatisicq.html, three-page document.

Dr. Markus E. Lautenbacher and Umesh Bhavsar, entitled "Intelligent Internet: Value-Added Services by Interworking Between Network Technologies," XVI World Telecom Congress Proceedings, Interactive Session 4—Networks and Services, pp. 45-51, 1997.

"Switching & Transmission, Global connections, Sep. 7, 1998— Summa Four Anchors E-Commerce Solution," Briefly, Switching & Transmission, Copyright © 1998 Primedia Intertec, http://www.internettelephony.com/archive/9.7.98/Stnews.htm, two-page document.

Russell Kahan, entitled "Mitel's Soho Phone—A Phone with a PC Assistant for the Work-At-Home Crowd," *Teleconnect* Oct. 1997, one-page document.

"Voice Synthesis for Conference Calling by Interface to Variable Distribution List", IBM Technical Disclosure Bulletin, US, IBM Corp. New York, vol. 37, No. 1, Jan. 1994, p. 285.

Patent Abstract of Japan, Publication No. 04104554, "Method and Device for Call Back of Private Branch Exchange", Apr. 7, 1992.

Patent Abstract of Japan, Publication No. 60150373, "Priority Callback System", Aug. 8, 1985.

* cited by examiner

Check Queued RTM Requests

Events Processed from Main Loop

Target User's System

Target User's System

Target User's System

Calling User's System

| PhoneMeet Status: At Desk, ? Hold all calls ||||||
| Status | Age | Caller | Pri | Reason | Info |
| --- | --- | --- | --- | --- | --- |
| In | 1 hour | John Chang | | Order | |
| Out | 4 hours | Alice Jones | | Budget Chat | |
| Unk | 8 hours | Harold Jenkins | | Referred by J. Birch | |
| Out | 1 day | Bob Smith | U | Hiring Crisis | |
| In | 2 days | Snidley Whip | ! | Hot stock tip | Telemarketer (93%) |
| Blue: You called Them   Black: They called you ||||||

Fig. 9(e)

| Welcome back. 5 calls are pending, 2 by you, 2 available, 2 out, 1 unknown. Do you wish to: |
| --- |
| ☑ Become available, taking the top pending call [XXX call description XXX]<br>☐ Remain unavailable<br>☐ Remain unavailable but examine call list to make call-by-call decisions |

Fig. 9(f)

| Running Advertisement | | | Picture of Caller |
|---|---|---|---|
| Caller/You Called: | John Chang | ☐ End Call (& take next call) | |
| Duration | 12:04 minutes | ☐ Change Class (select bar) | |
| Local Time | 4:32pm EST | ☐ End call & hold calls | 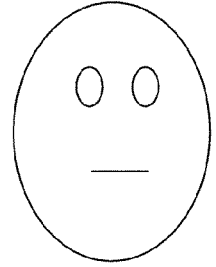 |
| Remote | 1:32pm PST | ☐ Rate the caller (select bar) | |
| Last Call | Jan 15, 1999 | ☐ Change call type | |
| Total Calls | 12 | ☐ Configure special parameters | |
| First Call | May 19, 1998 | ☐ General customization | |
| Reason | Chat about Fred | Phone controls (if CTI), ie, transfer call, etc. | |
| Other information from local databases on the caller. Ie, "John Chang is V.P., Marketing for consumer division," etc. | | Box for entry of notes on caller | |
| | | Box for billing information | Click to go to caller's web page |
| Here would be the status window (specified in Fig. 9(f) for pending calls | | | |

Fig. 9(g)

Ready to call John Chang.

Please pick up phone, call 555-555-5555, wait, ask receptionist for "bubba" (code word).
Click OK when call done

Calling Mary Smith by Internet IP telephone.

Click cancel to stop.

Cancel

Fig. 9(i)

METHOD AND APPARATUS FOR INTERMEDIATION OF MEETINGS AND CALLS

This application claims priority under 35 U.S.C. §119(e) from U.S. Provisional Application No. 60/104,255 of Bradley S. Templeton, filed Oct. 14, 1998, which is herein incorporated by reference in its entirety.

BACKGROUND OF THE INVENTION

1. Field of the Invention

The present invention relates generally to productivity tools and, specifically, to a method and apparatus that aid in managing telephone calls and meetings.

2. Related Art

Most people have experienced the phenomenon known as "phone tag." One person calls a second person and leaves voicemail. The second person returns the call, only to leave voicemail in turn. This sequence is repeated over the course of hours or days, leaving both callers frustrated by the fact that they have not spoken to each other in person. A similar phenomenon occurs when two people try to schedule conference calls and meetings or when two people try to get together for a face to face talk.

Even voice mail, faxes, pages, cell phones and e-mail have not solved this problem. In fact, they have only made it worse. Phone tag for voicemail, faxes and pages result in vast amounts of lost time—not just time calling and leaving messages, but delays in getting important phone calls made. In addition, tremendous time is wasted trying to be available for important calls, and even more by being interrupted by calls at just the wrong time when real work is getting done.

SUMMARY OF THE INVENTION

In accordance with the present invention, there is provided a method and apparatus to assist in the intermediation of telephone calls and meetings. The described embodiment of the invention is akin to a light on your desk that lights up when the person you are trying to reach is in her office and ready to take calls.

In this description, the person initially placing a request for a connection or call is termed the requester. The person he is trying to call, connect to, or meet with is called the target. It should be noted that the system of the target may end up calling the system of the requester in response to the requester's initial request. Thus, the terms requester and target refer to the initial requester and his target, and do not necessarily identify who ultimately places a call or initiates a meeting. Both requesters and targets are sometimes referred to herein as "users" or "parties" if such usage seems to improve clarity of an explanation.

In a first embodiment, a requester indicates that he wants to call, meet with, or otherwise connect with a target. Such a call, connection, or meeting is called a realtime meeting. His system sends a request to queue a call to the target system. If the target is available and wants to talk to the requester, a connection is made and the users proceed with their communication. Otherwise, the request is queued until both users are mutually available (or until a quorum is mutually available if there are more than two parties to a meeting). In other embodiments, requests are always queued before availability is determined.

In a first embodiment, the system of the users communicate directly. In other embodiments, the systems of the users communicate by way of intermediate servers, by way of a central server, or by any other appropriate method. Telephone calls can be made via a telephone system (such as POTS, a wireless system, or a cell phone), via Internet telephony, or via some other appropriate mechanism. (in the case of cell phones, the cell phone can act as a data processing system 100, keeping track of availability through actions such as pressing buttons on the phone, speaking to the phone, knowing when the user is moving and how fast (i.e., the difference between walking and driving), knowing if the phone is on the user's body (body heat), eventually knowing the user's exact location, both to decide availability and to route calls to landlines in that exact location, if desired.

Each user can set up priorities for the people who call or contact him. Requests from high priority persons will preferably interrupt the user, even if he is on another call. Requests from lower priority users will be queued. Alternately, requests from high priority persons will be flagged. Users can also rate other users. In embodiments where rating is enabled, the user and system can use the rating of the caller to prioritize, accept, or reject the request. The user can see ratings based on his own entries or ratings based on everyone who has rated an individual.

If a user is unavailable when a call is received, a request is queued. For queued requests, the system determines which requests have mutually available users and indicates that those calls can be completed. Availability is preferably determined based on a variety of factors, including whether the user is typing at his computer, whether the user is physically in the room, and scheduled periods of availability for a user. The calls that can be completed can be ranked according to a priority determination. Priority is preferably determined based on a variety of factors including who desired the call, the relationship of the callers, user-specified factors, elapsed time since the call was requested, and anticipated call duration.

BRIEF DESCRIPTION OF THE DRAWINGS

FIGS. 9(e)-9(g) show another exemplary user interface on a user's system.

FIG. 9(h) shows an exemplary dialog box that enables the user to inform the system when he has completed a call using a telephone.

FIG. 9(i) shows an exemplary dialog box that enables the user to place an Internet telephony telephone call directly from the computer without using the telephone.

DETAILED DESCRIPTION

General Discussion

Figure 1A:
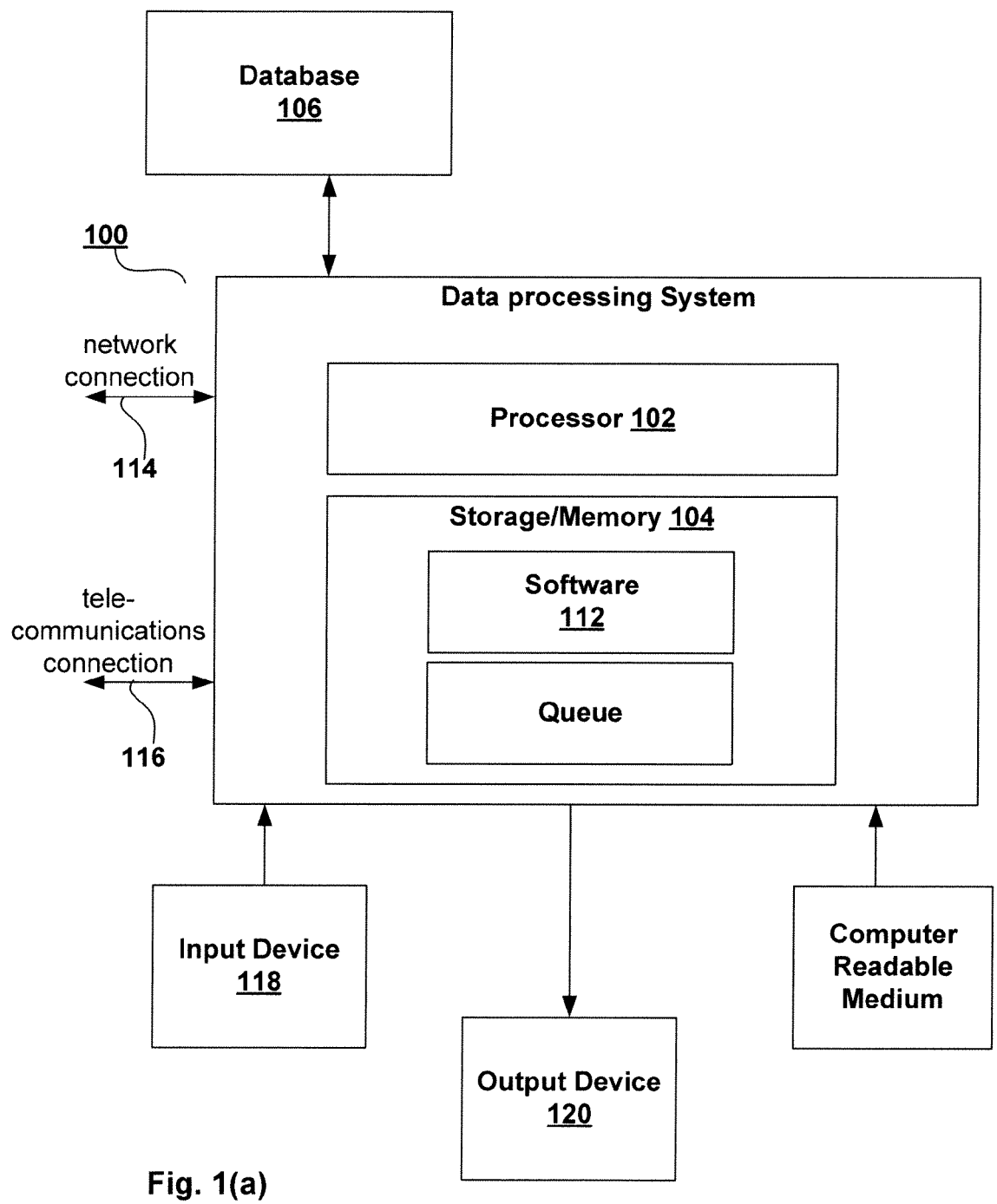
FIG. 1(a) is a block diagram of the overall architecture of a data processing system in accordance with an embodiment of the present invention.

The present invention may be implemented on a computer system, such as the caller's data processing system 100 illustrated in FIG. 1(a). It is contemplated that a person being called will have a similar system, as described herein. The data processing system 100 has at least one processor 102 and associated computer memory or computer storage 104. Memory 104 includes at least one software component 112 for implementing the tasks described herein. The described embodiments of the present invention may be performed when instructions contained in memory 104 or other appropriate memories are executed by the processor 102 or other appropriate processors. The system also preferably includes a database 106. Certain implementations of the system can also connect to a telecommunications system 116 to place calls (or can use Internet telephony via network connection 114).

Data processing system 100 also preferably includes a network connection 114, such as a connection to a LAN, a WAN, and/or the Internet or to some other appropriate network. System 100 preferably includes an input devices(s) 118 such as a keyboard, touch screen, or the like. System 100 preferably includes an output device(s) 120 such as a printer, display screen or the like. System 100 also includes a computer readable medium 124. Computer readable medium 124 may be any appropriate medium that has instructions and/or data stored thereon. These instructions and data may be loaded from computer readable media 124 into computer memory 104. Instructions and data can also be loaded into memory in the form of a carrier wave, or by any other type of signal over network connection 114.

System 100 also includes an operating system (not shown). A person of ordinary skill in the art will understand that the memory 104 and computer readable media 124 may contain additional information, such as other application programs, operating systems, other data, etc., which are not shown in the figure for the sake of clarity. It will be understood that data processing system 100 (or any other data processing system described herein) can include numerous elements not shown in FIG. 1(a), such as additional data, software and/or information in memory, disk drives, keyboards, display devices, network connections, additional memory, additional CPUs or processors, input/output lines, etc.

In the discussion herein, it will be understood that the invention is not limited to any particular implementation or programming technique and that the invention may be implemented using any appropriate techniques for implementing the functionality described herein. The invention is not limited to any particular programming language, operating system, or network protocol. The system may use any appropriate type of telecommunications systems, including but not limited to POTS (plain old telephone system), cellular telephones, wireless telephones, and Internet telephony.

Some or all of the instructions and data structures in storage area 104 may be read into memory from computer-readable media 124. Execution of sequences of instructions contained in the storage areas causes processor 102 to perform the process steps described herein. In alternative embodiments, hard-wired circuitry may be used in place of or in combination with software instructions to implement the invention. Thus, preferred embodiments of the invention are not limited to any specific combination of hardware circuitry and software.

In FIG. 1(a), database 106 stores the request of one party to call (or meet with) another, along with various parameters and options about the desired call. Software 112 uses various metrics to decide if a party is available for a call, including explicit action (i.e., by the party running a program or invoking a function in a running program) and implicit measurements such as tracking keyboard and mouse activity, noise in the room, phone use, lights, door activity, motion sensors (and other devices used by security systems), "electric eye" etc. Computer network 114, for example, is a network connection such as the Internet or any LAN or WAN (or even modem calls) to allow some system (either one belonging to the caller or a central server) to determine that two parties that desire a call are both available or potentially available for the call (or until a quorum is available if there are more than two parties to a meeting).

Figure 1B:
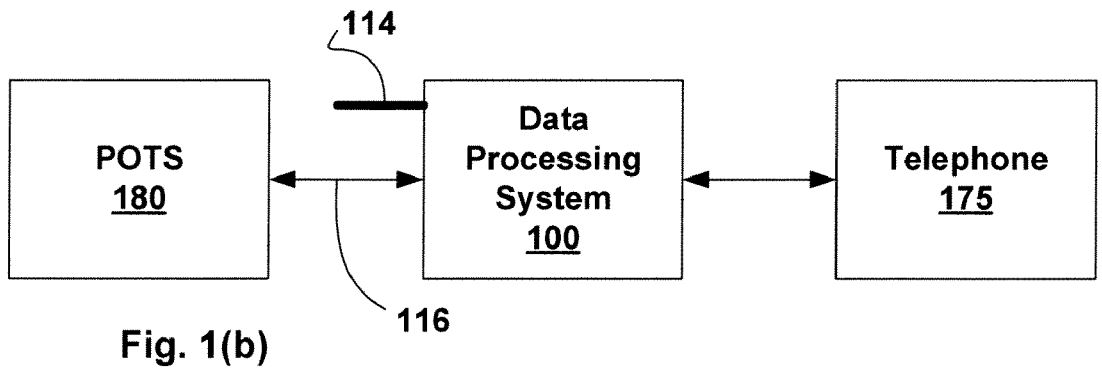
FIGS. 1(b)-1(d) are block diagrams of data processors in accordance with other embodiments of the present invention.
Figure 1C:
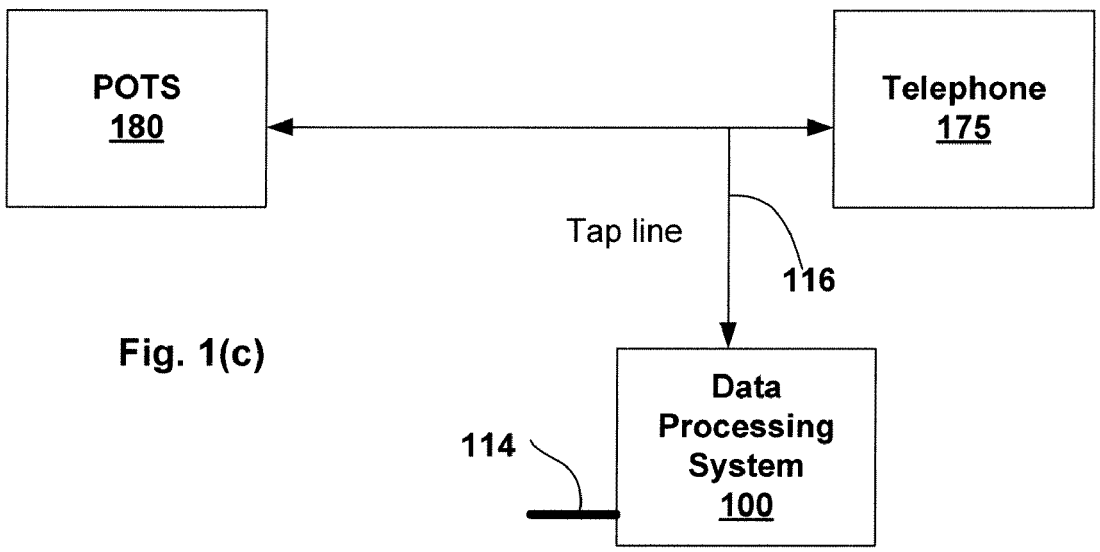
Figure 1D:
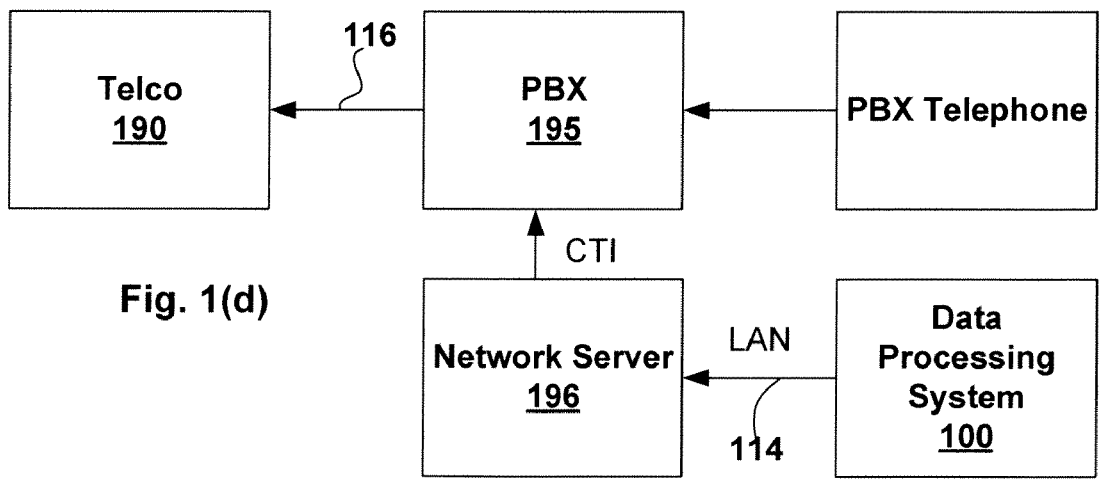

FIG. 1(b) shows an alternate embodiment in which data processing system 100 is located between a telephone and the POTS system. FIG. 1(c) shows an alternate embodiment in which data processing system 100 taps into a line between a telephone and the POTS system. FIG. 1(d) shows an alternate embodiment in which data processing system 100 communicates with a PBX system via a network server. The network server communicates with the PBX system using the known CTI (Computer Telephony Integration) standard or another appropriate standard.

As discussed below, once a determination of mutual availability has been made, either of the users may take steps to initiate the call, either directly by computer control of the medium (the phone, or IP telephony or other media) or by informing one or both of the parties that the call should be made and asking one to manually place it (and the other to manually receive it).

Description of Certain Preferred Embodiments

The following paragraphs describe certain embodiments of the present invention that are part of a "The described embodiment" embodiment of the invention. The described embodiment of the present invention is akin to a light on your desk that lights up when a person you are trying to reach is in her office and ready to take your call.

In one embodiment, when Alice wants to call Bob, she doesn't just pick up the phone and dial. Instead she picks up the mouse and clicks on Bob, or enters his phone number, E-mail, or other address. (Alternately, Alice can dial a standard telephone and her dialing is simply input to a computer following the processes described herein instead of direct signaling of the traditional telephone network). These actions will register a desire to talk with either Bob's server, the central server or a local company intranet server, depending on the embodiment.

In this example, Bob is running the described embodiment client too. Because Bob's client is hooked to his screen saver and other applications, it knows when he is at his computer. If he is, and ready for her call, then Alice might be told she can call right away. Bob's current number will pop up on the screen and she can dial it. With advanced phone systems, the computer might actually dial the phone or complete the call—making it look to Alice just like a phone call: "dial" a number and a call is placed.

As they talk, Bob's and Alice's software clients are busy entertaining them and showing them ads. This situation is advantageous to advertisers because both are known to be present, and talking, but their eyes are free and drawn to the screen.

Preferably, Bob and Alice's computers know when Bob and Alice are finished. They may have an inexpensive hookup to the physical phone wires, or the computer's microphone may notice a lack of talking for a few minutes. Or they may manually click, to indicate they are done, and either leaving, ready for other calls, or want calls held for a while. It only takes one of them to signal the termination of the call. Signaling the end of a call usually means that the user is available, although in certain embodiments, it may be up to the user to signal availability.

The system knows when Bob and Alice are at their desks, ready for calls. As soon as both of them are there at the same time it notices, and gets ready to set up the call Alice wanted. Thus, the embodiment avoids phone tag and interruptions.

Figure 2A:
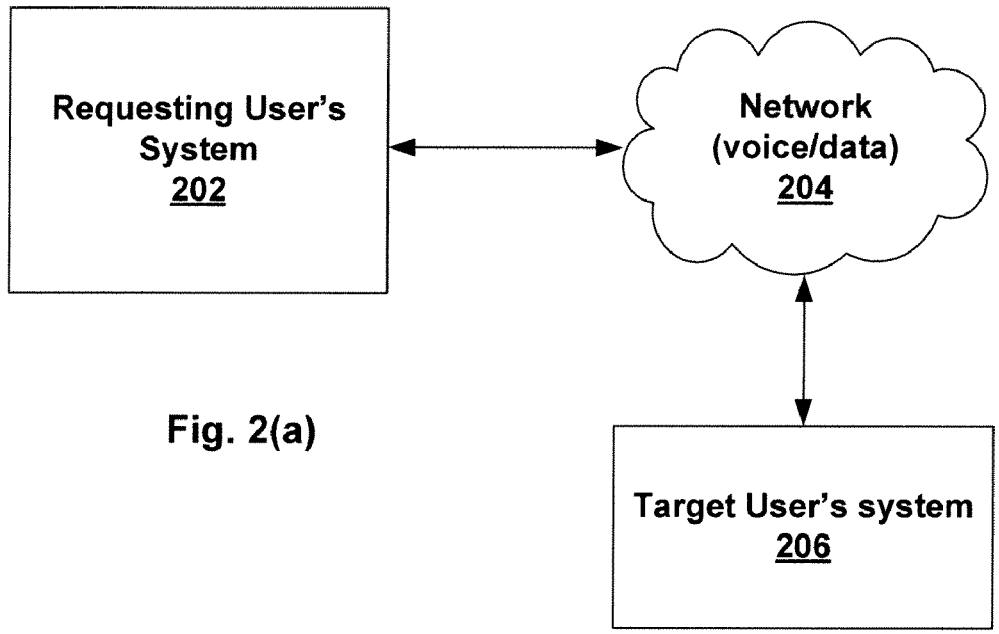
FIGS. 2(a)-2(f) are block diagrams of various exemplary network organizations that can be used with the present invention.

FIGS. 2(a)-2(f) are block diagrams of various exemplary network organizations that can be used with the present invention. FIG. 2(a) shows an embodiment in which a requester's system 202 connects to a target's system 206 via a network 204 such as the Internet, an intranet, a wireless network, or some other appropriate network.

Figure 2B:
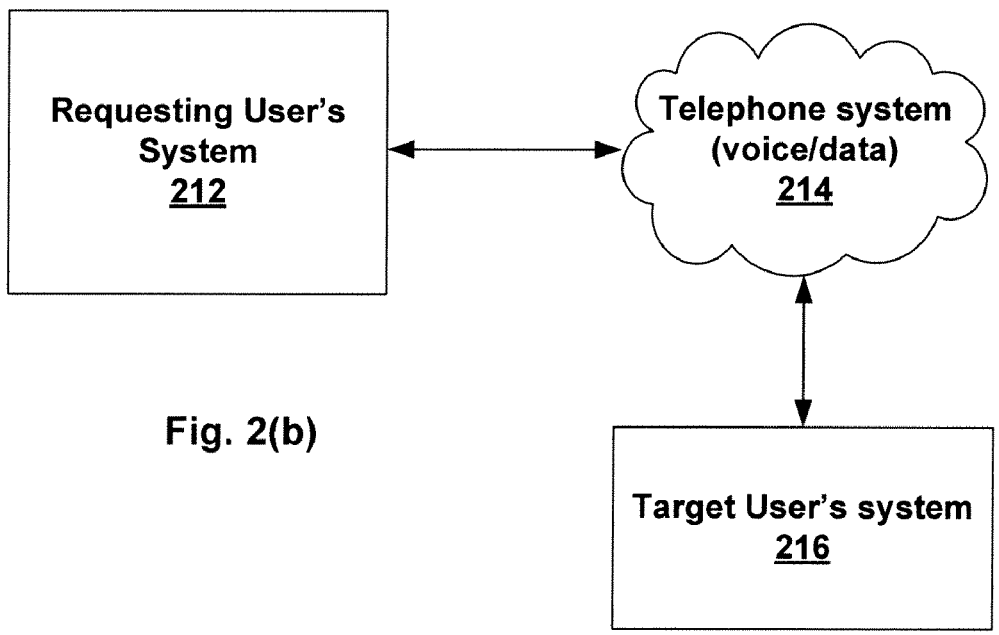

FIG. 2(b) shows an embodiment in which a requester's system 212 connects to a target's system 216 via a telephone system 214 such as POTS, a cellular network, a wireless network, or some other appropriate telephone system. The systems may communicate data through, for example, touch tones or modem transmissions.

Figure 2C:
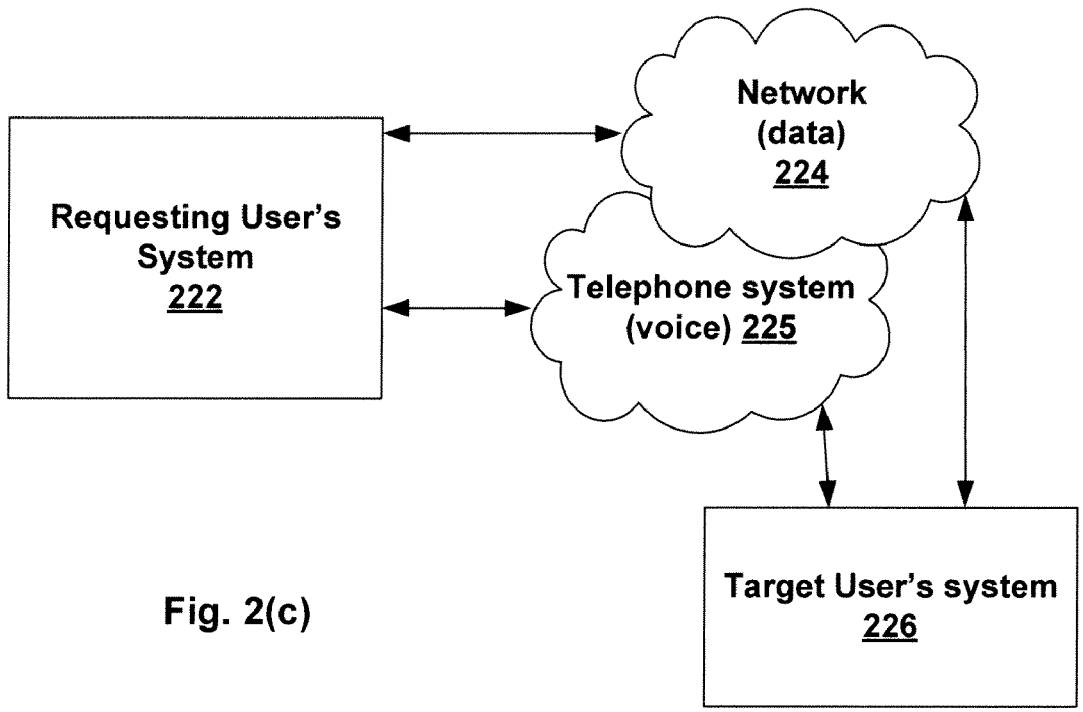

FIG. 2(c) shows an embodiment in which a requester's system 222 connects to a target's system 226 via a network 224 and a telephone system 225. In such a system, messages about call availability might be sent via the network while the actual connection for the call is made through the telephone system.

Figure 2D:
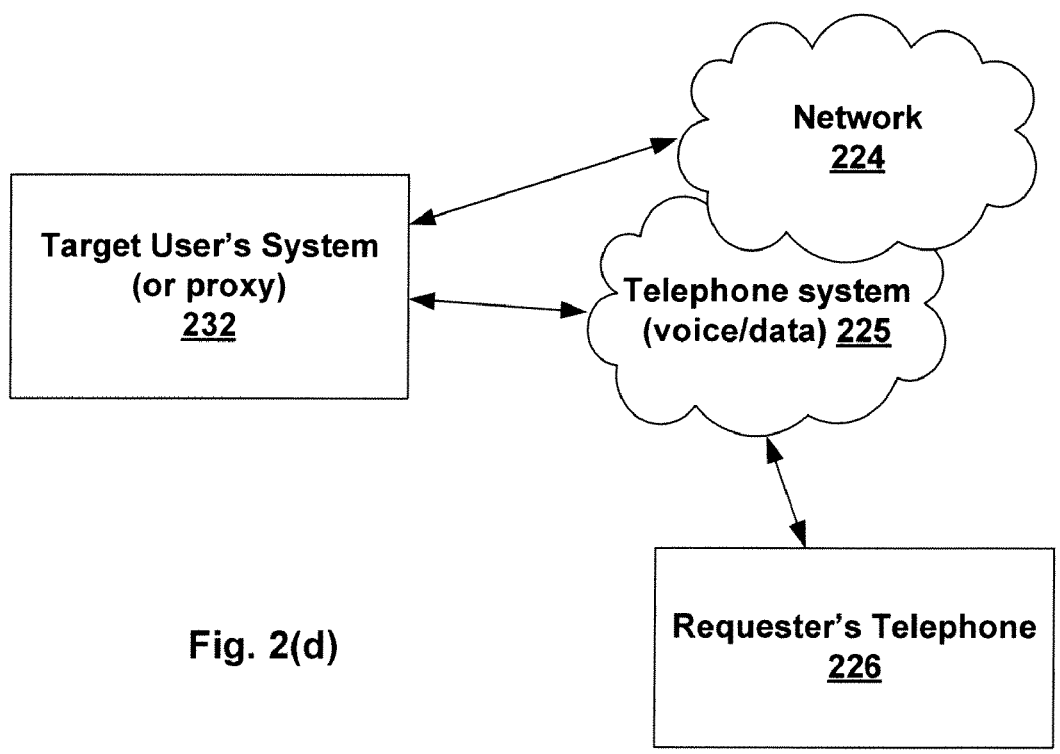

FIG. 2(d) shows an embodiment in which a requester's system 226 connects to a target's system 232 (or a target's proxy) via a network 224, but in which the requester system connects to the target only via a telephone. For example, the requester may not have a software client installed on his computer. The requester can still indicate availability by calling the target system or a central server acting for the target (or the requester) and entering touch tones. Alternately, a target system can be a specially adapted telephone.

Figure 2E:
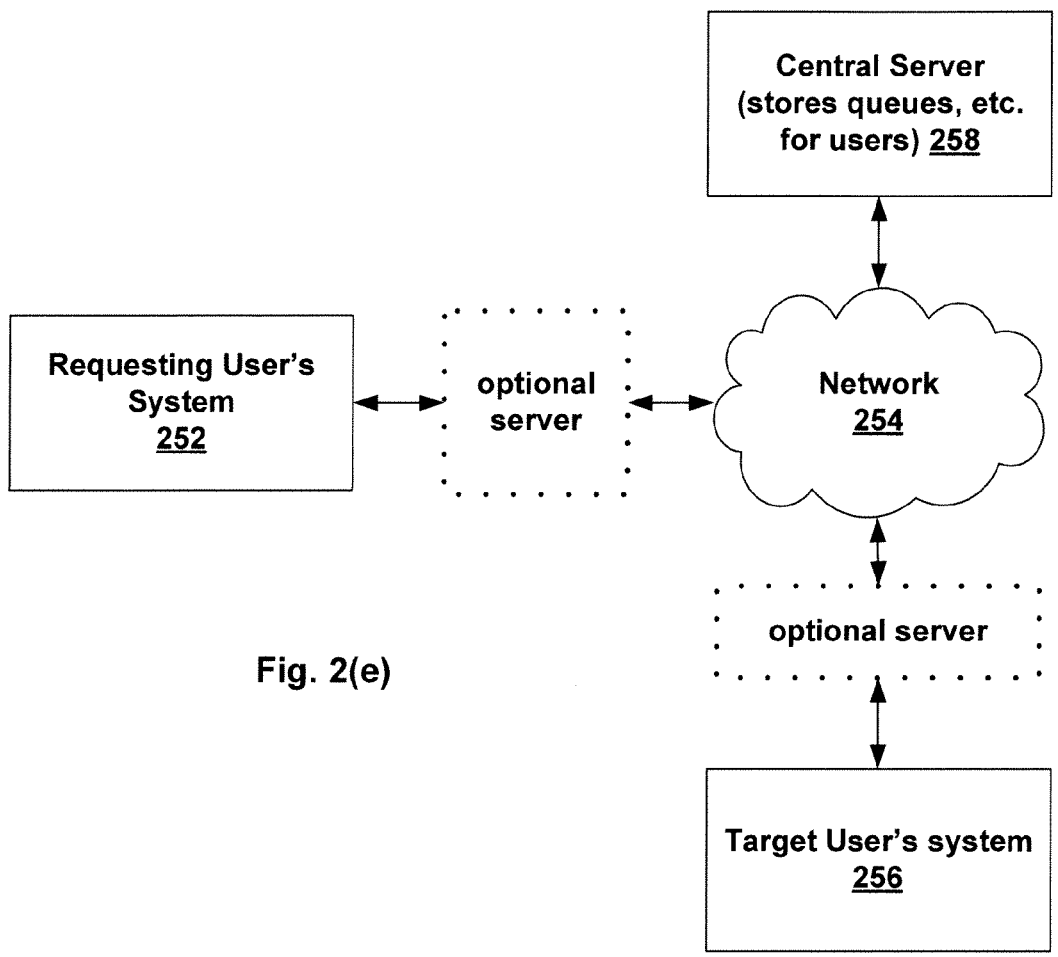

FIG. 2(e) shows an embodiment in which a requester's system 252 connects to a target's system 256 via a network 254 and in which a central server coordinates the management of calls for the user systems. In at least one embodiment, the queue of waiting messages and databases for priority and sorting are located on the central server.

FIG. 2(e) also shows optional servers connecting the requester and target to the network. These servers can be, for example, proxy servers, firewalls, backups, or directory servers for the target or requester.

Figure 2F:
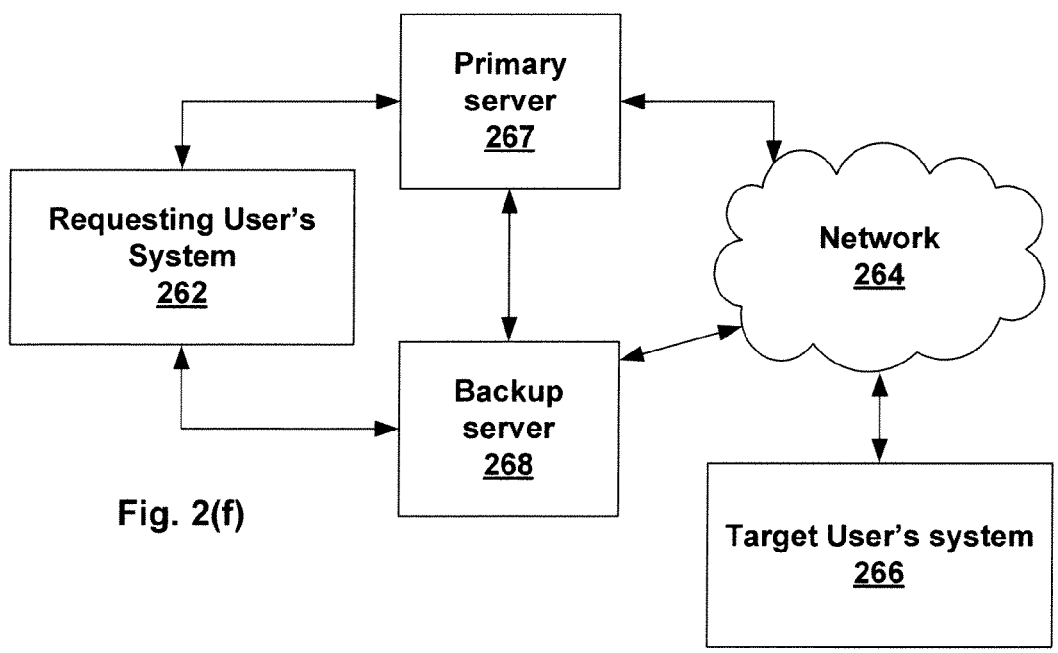

FIG. 2(f) shows an embodiment in which a requester's system 262 connects to a target's system 266 via a network 264. At least one of the user systems 262, 264 have a primary server 267 and a backup server 268 for added redundancy and fault tolerance.

Figure 3:
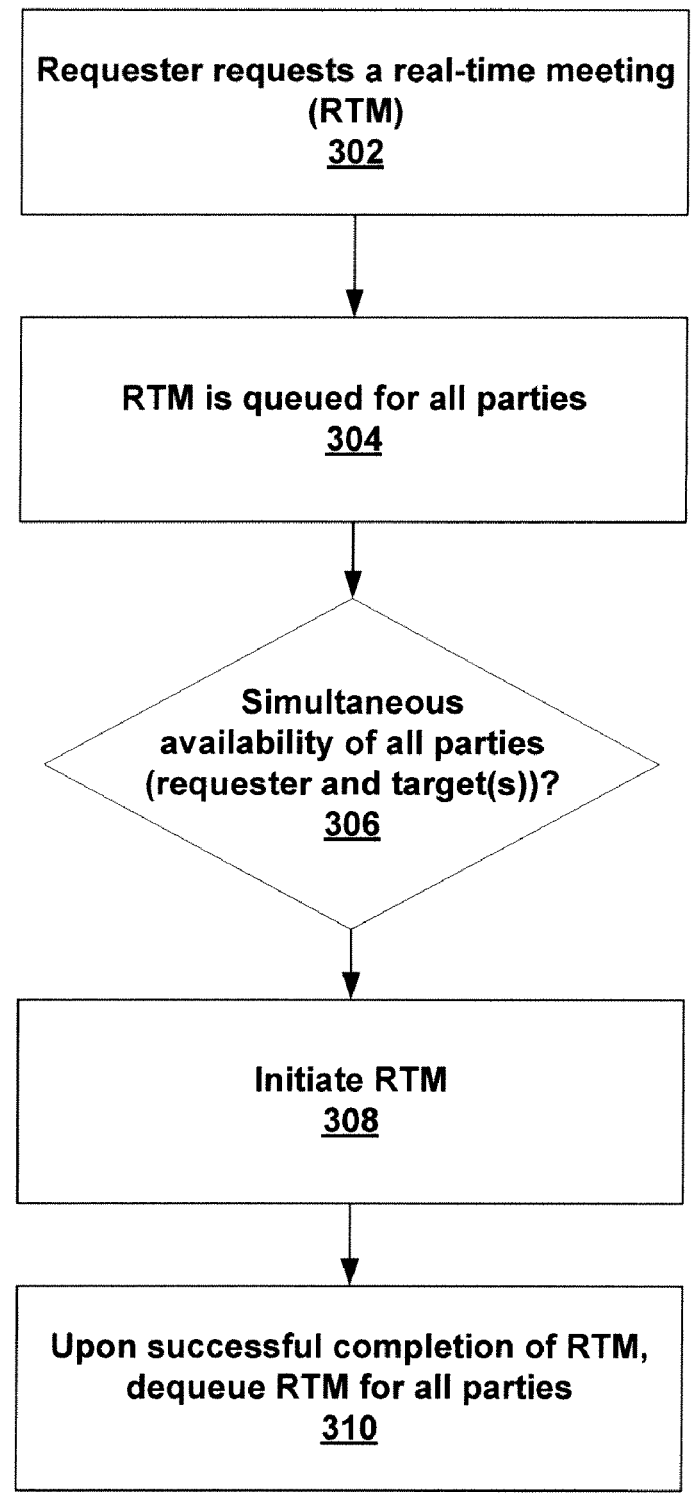
FIG. 3 is a flow chart showing a method for requesting and completing a realtime message (RTM) between a requester and a target.

FIG. 3 is a flow chart showing a method for requesting and completing a realtime message (RTM) between a requester and a target. (An RTM is also referred to herein as a "call" because many embodiments of the invention, the purpose of the embodiment is to mediate telephone calls.) Examples of realtime messages include telephone calls, face to face meetings, and conference calls between two or more people. In element 302 of FIG. 3, a requester sends a message requesting a realtime meeting. This request is sent to one or more targets. Alternately, targets and requesters may be associated with each other in an arbitrary graph based on requests between parties. For example, user A may request a meeting with user B, and B may request to add user C. All three parties would become parties to the meeting.

In step 304, an RTM is queued in the systems of all parties (i.e., for the requester and target(s)). As users become available, their systems signal the other systems of this availability. Similarly, if users become unavailable, this is also signaled.

In element 306, if there is mutual availability for the parties (or for a quorum if more than two parties), the users are so informed and allowed to initiate an RTM. In certain embodiments, the system initiates an RTM without user intervention when mutual availability is determined. In element 310, upon successful completion of an RTM, the RTMs are dequeued for the requester and the targets.

Figure 4:
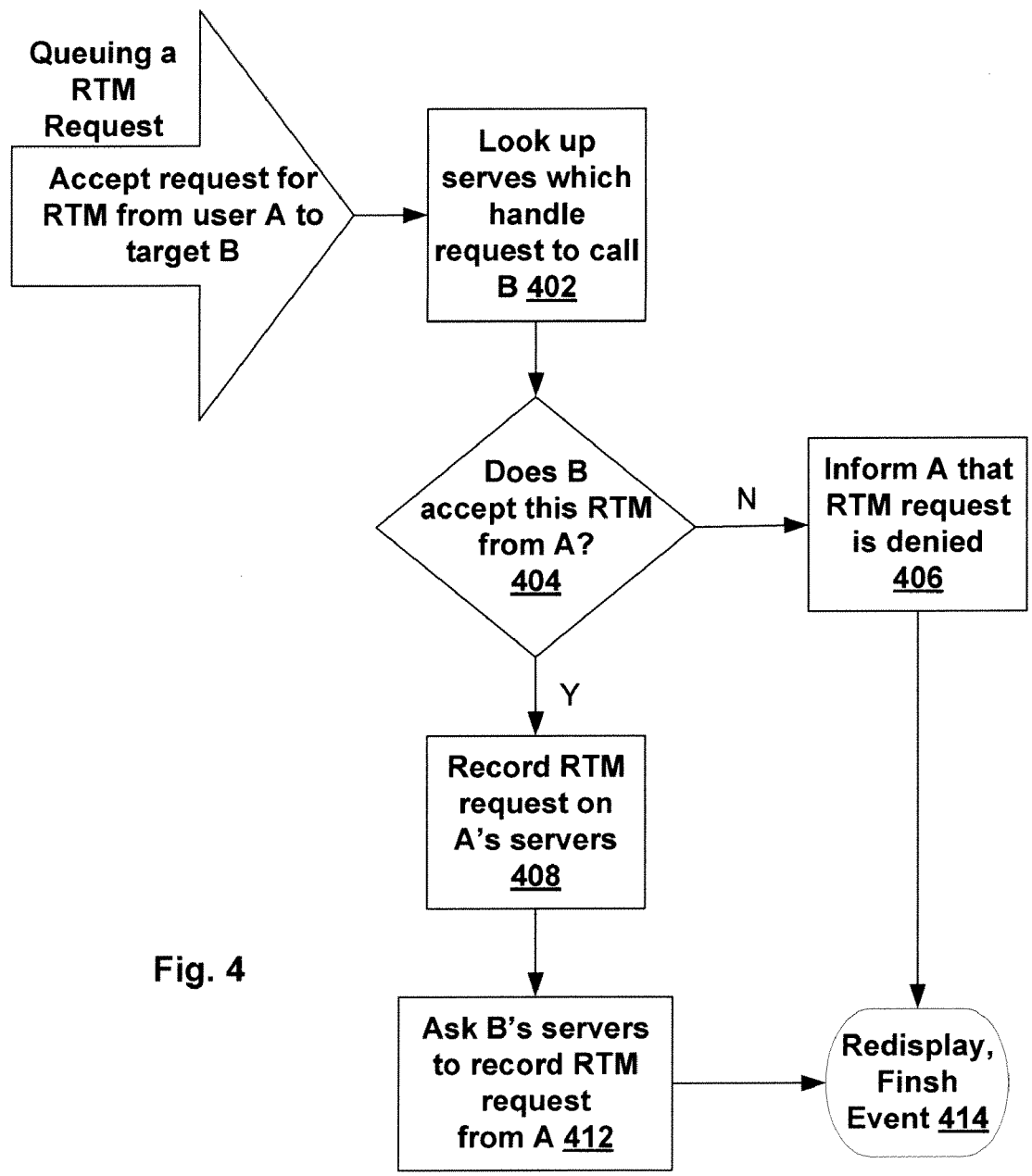
FIG. 4 is a flow chart showing queuing a request.

FIG. 4 is a flow chart showing queuing an RTM request. The queues generally reside on the user's systems. In a system with optional servers, if a user system receives an RTM request from user A to user B, the system looks up servers that handle requests to call user B in element 402. If the system of user B does not accept the call in element 404, the system informs user A that the RTM request is denied in element 406. Otherwise, in element 408, the RTM request is recorded on user A's server and the system asks B's servers to record an RTM request from user A in element 412. The event is redisplayed in element 414.

Figure 5:
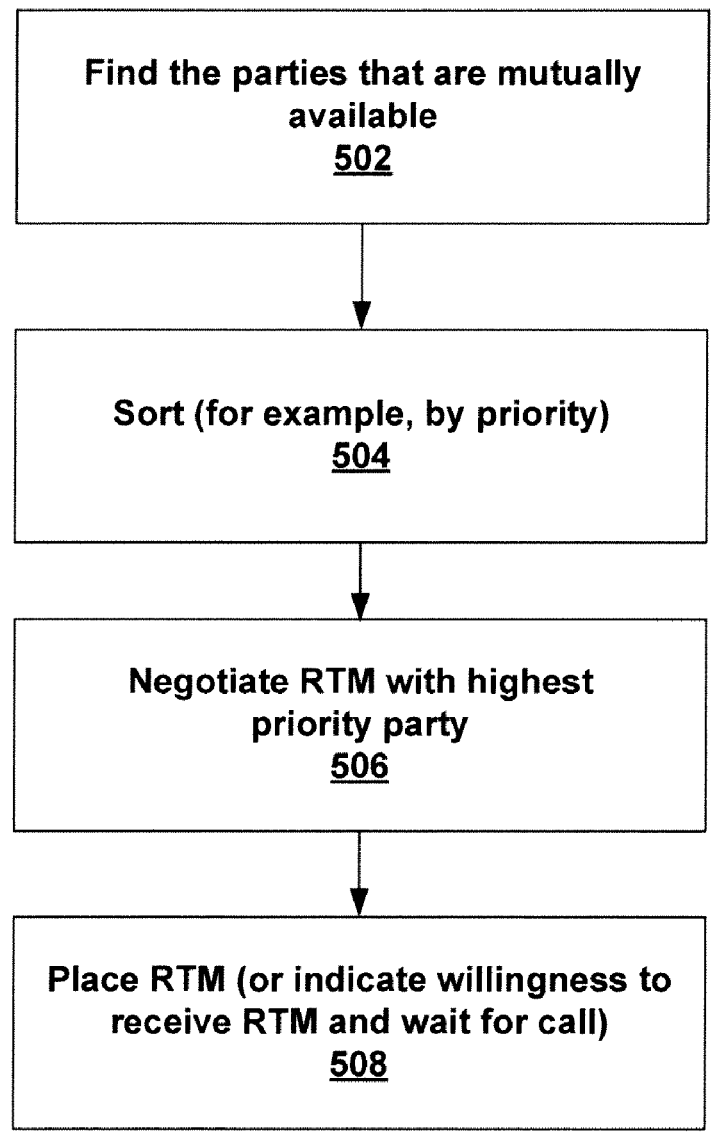
FIG. 5 is a flow chart showing checking the queued requests.

FIG. 5 is a flow chart showing checking the queued RTM requests. A user might not accept a request by user choice or preprogramming. In element 502, the system finds the queued RTMs that are for users who are mutually available. Mutual availability means, at a minimum, that both users are present and available to talk to or meet with each other. Various embodiments of the present invention use various criteria for determining availability. For example, availability events can include but are not limited to:

Start or end of call or other use of phone.
        Off-hook: Unavailable
        Recently off-hook: Probably available
    Recent activity at computer input devices (mouse, keyboard etc.)
        Probably available
    Conversation near microphone
        Available but possibly in meeting. Possibly Available after conversation stops.
    Lights turned on/off (based on time of day)
        Possibly available if lights turned on recently and still on. Not available after lights off outside daylight hours
    Weight in chair or on floor
        Possibly available if sitting in chair
    Motion sensor triggers/stops triggering
        Available if recent motion sensed in room
    (others as needed)
    Opening/closing of door
        User may configure "door closed" as a signal of unavailability.
    Spoken commands
        Simple voice recognition (closest match) on phrases such as "hold calls" etc.
    Computer keyboard/mouse based commands
        User may of course set availability state, or even browse pending calls using computer interface
    Touchtone commands
        If system is able to listen to DTMF tones from phone, users may prefer to use these to substitute for computer commands.

Remote access touchtone commands
   If user is not at desk but using remote phone interface, touchtone codes (and caller ID information from incoming call) to control system, change location, set availability status.
Scheduled periods of availability
   User may have default periods when they are always available unless they signal otherwise or metrics signal otherwise. The system may determine his availability by reading the user's calendar.

In certain embodiments, availability can take several states, which interact with request priority. In addition, availability to a given party generally requires that there is not another party or parties for whom simultaneous availability is also present when the RTM with that party or parties is of higher priority.

Certain embodiments allow requesters and targets to specify their availability during a predetermined time period, such as the estimated duration of the RTM.

Once availability has been determined, mutual availability is determined. Mutual Availability communication and determination depends on combination of all user's privacy rights and demands for the particular communication. Options include but are not limited to:

1) Party always sends any change in availability status over network to other parties for whom an RTM request is queued. Both systems immediately detect mutual availability, and move to call-setup negotiation
2) Party does not send availability changes, but queries remote availability for parties in RTM request queue from time to time or on change of status
3) Party transmits availability changes and status to trusted 3rd server. So do other parties. 3rd server detects mutual availability and informs one or both parties.

In all cases a proxy server may act for a direct user, and polling may take the place of "push" transmission of status/availability information. Availability status is user-specific. A user may be available to one person but not to another. Transmission of state information may be one-way, i.e. one party may be willing to tell the other of state, but not expect reciprocal information. Normally the party desiring the call will reveal state, and the recipient will hide it unless specified otherwise. Queries, if made, may be anonymous or identified. Users may reject anonymous queries, and keep records of identified queries.

Any program hooked into the screen saver interface knows when a user is using his computer. If the user is using his computer, he is presumed to be in his office. And unless he does a simple click to asks to hold his calls, he is ready for calls. Other simple hardware can look into other clues, such as sound, or the lights being on. For the serious user, small pressure sensors in chairs or a pair of photocell door sensors could do the trick. Or the user's receptionist can track when he is ready for calls, as human assistants normally do.

If the user forgets to hold calls, his first call does not need to actually ring. It rings on the computer and pops up a window to ask if the user wants to engage it (see FIG. 9). The user can either do that, or hold calls as if he isn't in the office.

In element 504 of FIG. 5, the system sorts the messages having mutual availability in accordance with a message priority. These priority sorting factors can include, but are not limited to:

Who desired call
   Calls the user initiated are normally more important than ones others initiated to the user.
Relationship (customer/supplier/family/friend/colleague etc.)
   Calls with customer more important than suppliers. Calls with family/friends may be higher or lower in priority than others. Boss gets more priority than subordinates etc. All user tunable. For customers, level of service customer has purchased or other factors related to importance of customer may also factor in.
Manually input priority factors (both users, both per call and per user)
   User may specify default priorities for different people. User may also examine screen of pending queued calls and alter their priority.
Elapsed time since RTM requested
   The longer somebody has been waiting for a call since asking for it, the more important.
Expiration time on RTM request
   If the caller indicated the call needs to take place before a certain time, the closer it gets to this time the more important it is.
Expected remaining time of availability
   If one party indicated they will only be available for a limited time, such calls are more important.
Anticipated call duration
   If the call is expected to be short, it may get a higher priority.
Past history (call difficulty, truthfulness, call frequency)
   Parties not called frequently may get more or less priority. Parties that have lied in providing call information may get much less priority. Parties with a history of the period between call queuing and initiation being long may get a higher priority. ("hard to reach people")

The system can be programmed to treat different people differently. Some can get through when others cannot. A user's family might get through any time their request has a priority of urgent. The user's co-workers and key customers might have higher level access. Cold callers would have to identify themselves, and say what the call is about. That text would appear on the screen before accepting a call.

Figure 9A:
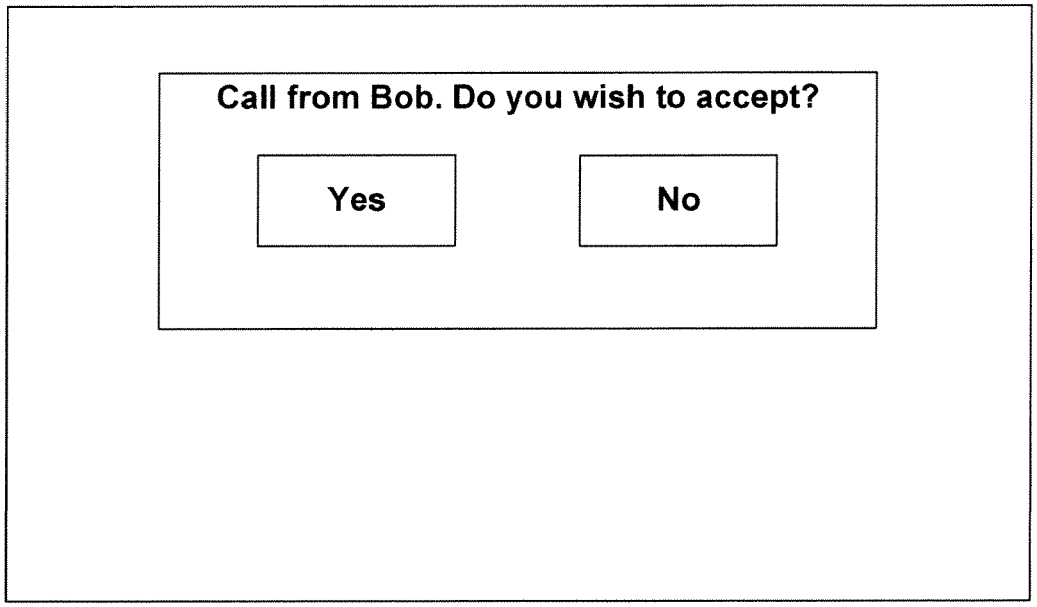
FIGS. 9(a)-9(c) show exemplary user interface on a target's system.
Figure 9B:
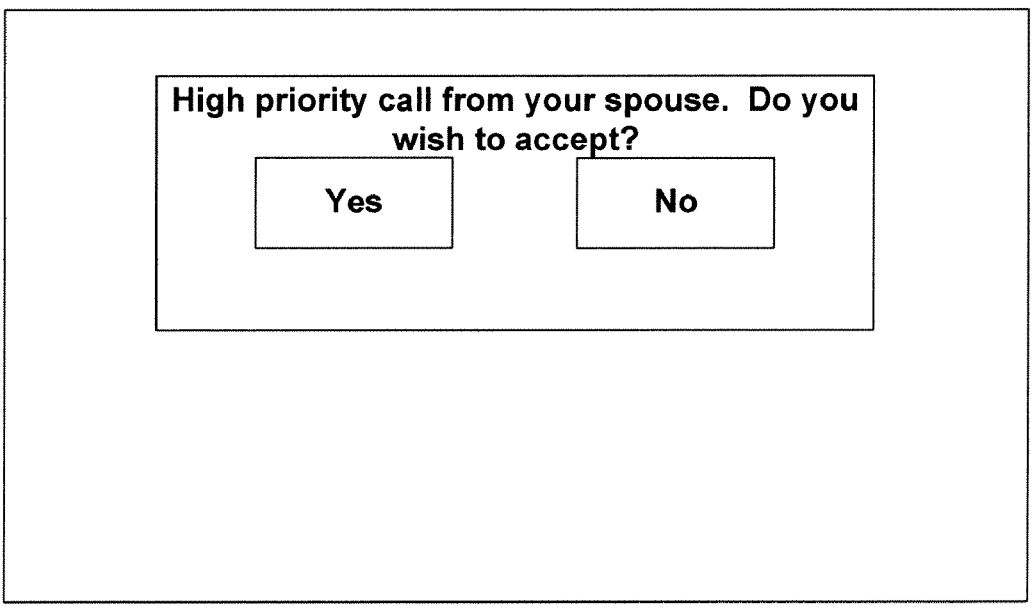
Figure 9C:
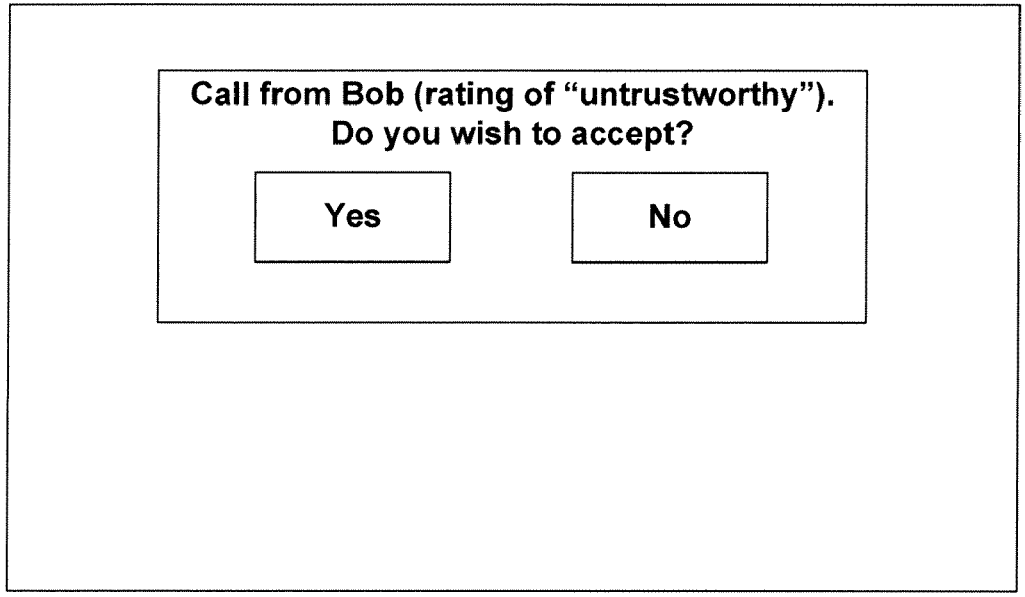
Figure 9D:
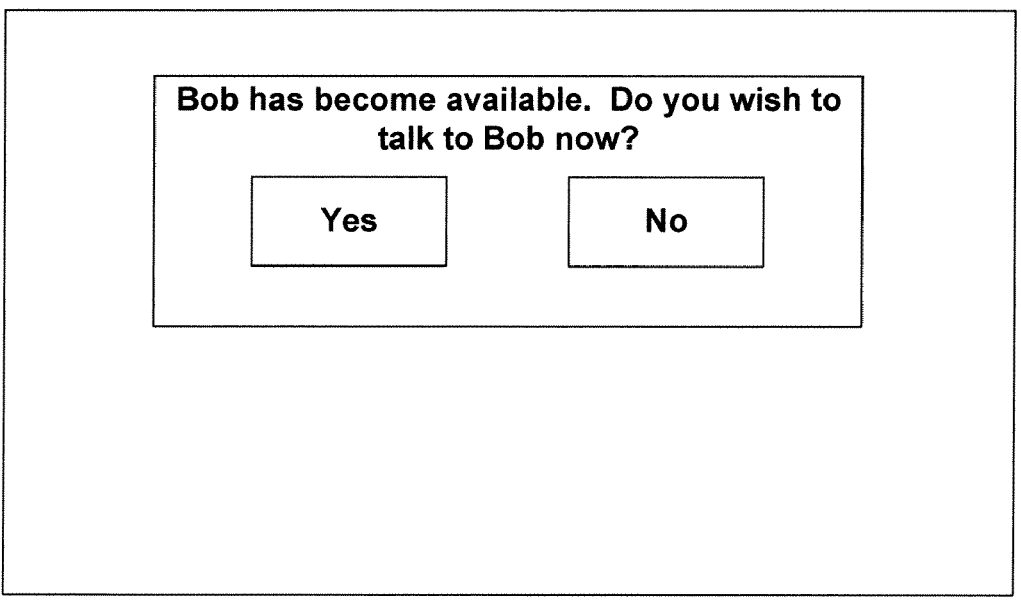
FIG. 9(d) shows an exemplary user interface on a requester's system.

Cold calling stockbrokers might willingly identify themselves that way because anybody who lies more than a few times about their purpose in calling could become blacklisted in the ranking database (see for example FIG. 9(c)). If they try to call anybody at all, the fact that they are blacklisted will be featured prominently for the user to see before deciding to accept. Thus, while the user can use the described embodiment in a very simple fashion, to be in or out, if he wants to, he can also finely tune it to be in or out for different classes of people at different times.

In element 506 the system negotiates a call with a highest priority party. In element 508, the system places the call (or indicates a willingness to receive and waits for the target/system to place a call).

Figure 6:
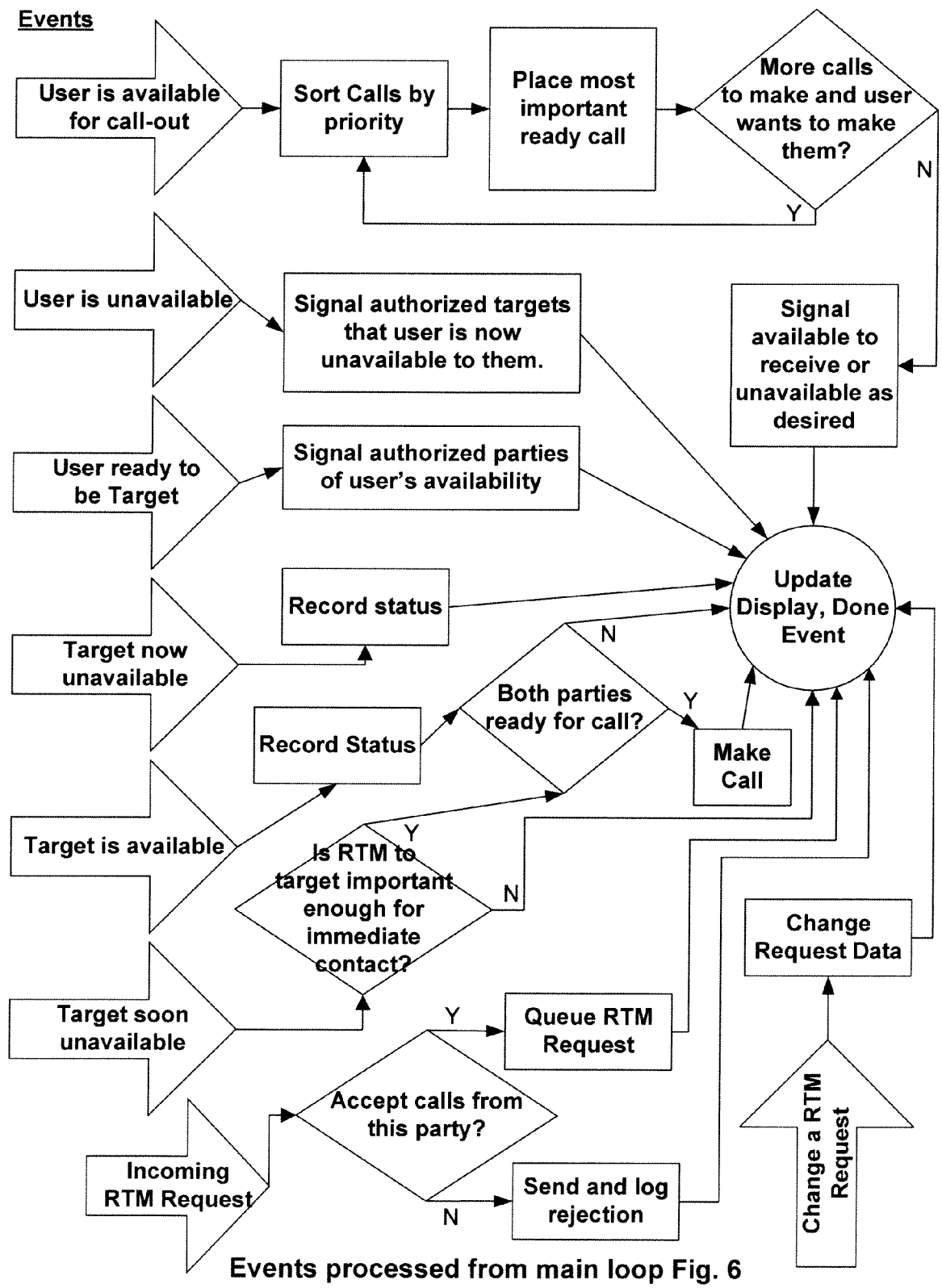
FIG. 6 is a flow chart showing an exemplary main loop that processes events.
Figure 7:
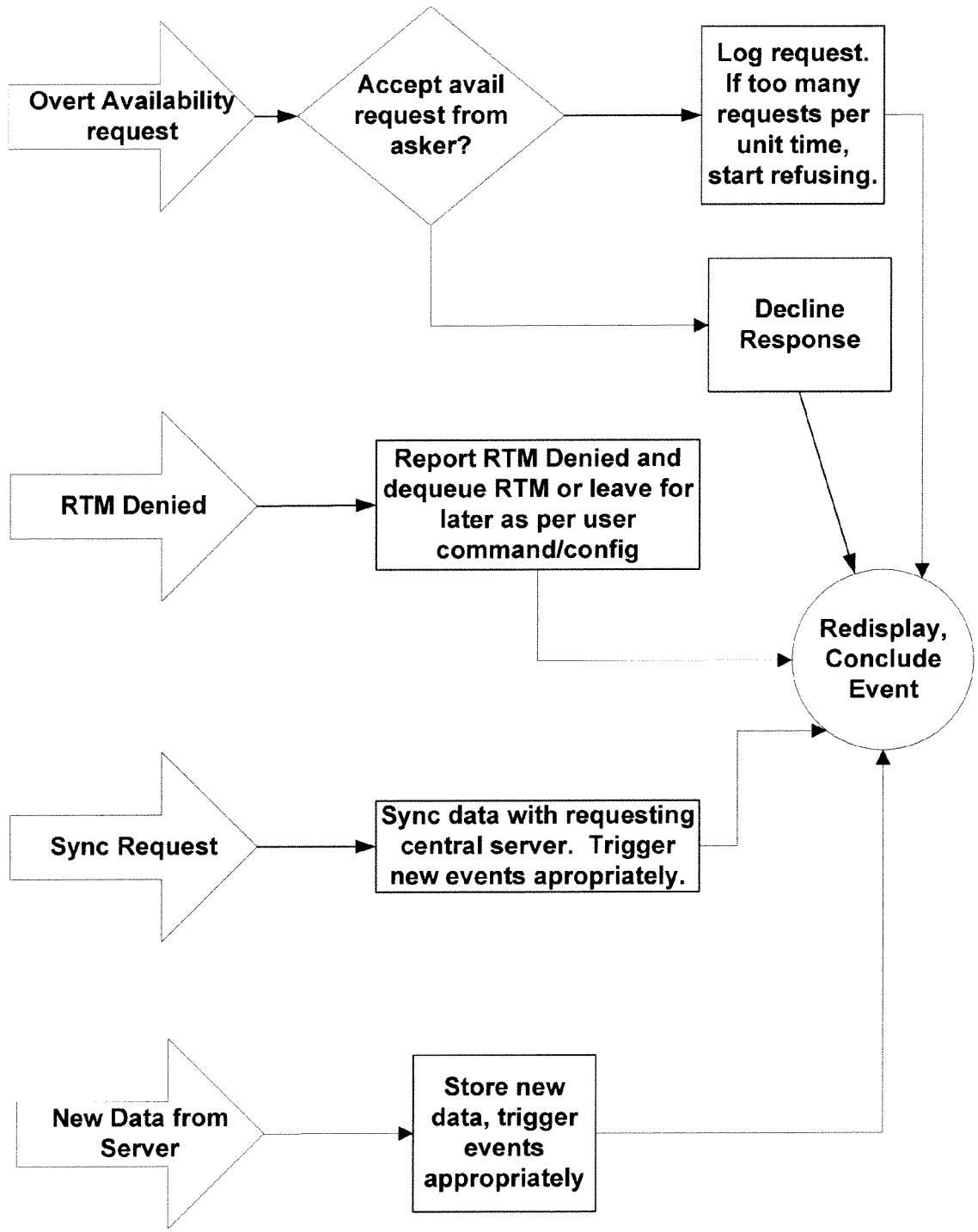
FIG. 7 is a flow chart showing additional steps of the main loop of FIG. 6.

FIGS. 6 and 7 are flow charts showing an exemplary main loop that processes events. The Server Main Loop preferably includes the following:

Receive requests and status information from outside servers
For those servers that can't push, or which haven't made contact in long period, poll at suitable polling interval
Do polling based checks on user availability. (Also receive and respond to event based information about availability)
Detect when both parties are available for call.
Send status change information to secondary servers, and partner servers enabled for this information.

Figure 8:
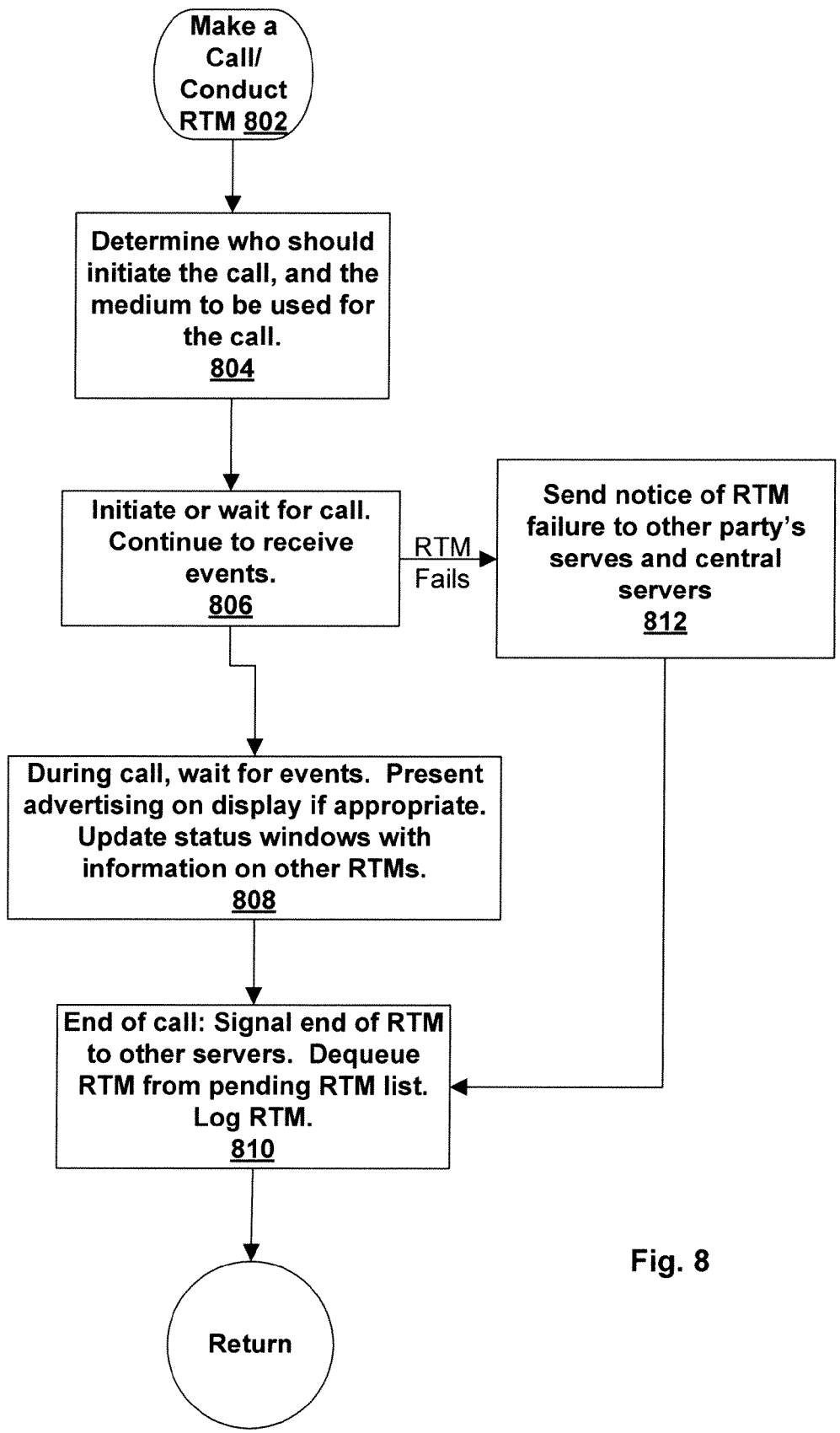
FIG. 8 is a flow chart showing how to make a call, which is a specific example of conducting a realtime meeting).

The events processed by the server include but are not limited to:
- User is available for a call-out
- User is unavailable
- User ready to be called
- Target now unavailable
- Target is available
- Target soon available
- Incoming RTM request
- Change an RTM request
- Overt availability request
- Call denied
- Synch request (from other server for user)
- New data from server FIG. 8 is a flow chart showing how to conduct an RTM (for example, how to make a telephone call). In element 804, the system determines who should initiate the call and determines the medium to be used for the call. The described embodiment can also easily resolve problems of who calls whom. Traditional phone tag puts the cost of a call on whoever was "it" when the calls clicked, and business usually accepts this. But if desired and mutually agreeable, the system can be configured so that the person who first requested the RTM is asked to make the call. Or perhaps the supplier always pays for the call, even if the customer initiated it, like an 800 number. Perhaps the person with the most annoying call screening initiates the call, or the person for whom it is most convenient.

In some cases a user might not want people to even know his phone number. In this case he would ask to always make the call. In one embodiment, the parties request a central server associated with a telephone company to create the call by having the telephone company call both of the users and hooking them together, somewhat like a conference call. Thus, neither needs to reveal their telephone number. Alternately, the user might be at a phone booth, or hotel, or foreign telephone and have a hard time making, or receiving calls. He might not even be at his normal number. He might be on the road, and tell the system his temporary number using its telephone or web interface. Then calls could be sent to him at his current location, even if the caller entered his "base" phone number when dialing.

In element 806, the user's system initiates or waits for a call. While waiting, it continues to receive events. If it initiates and the call fails in element 812, the user system sends a notice of the call's failure to the other party's servers and to the central server. Otherwise, the system waits for events (see FIGS. 6 and 7). Certain embodiments may also display advertising or update status windows during a call.

In element 810, when the call ends, the system signals the end of the call to other servers and dequeues the call from the pending call list. Certain embodiments also log the call. In certain embodiments, the system also must explicitly state that its user is available.

FIGS. 9(*a*)-9(*c*) show exemplary user interface on a target user's system. FIG. 9(*a*) shows an exemplary dialog box stating that a particular user ("Bob") has requested an RTM (call) with the target user. The target may decide to accept or reject the call. FIG. 9(*b*) shows an exemplary dialog box resulting from a request from a high priority user. In such as case, the message may appear on the target's screen even when the target is busy or not available to regular users. FIG. 9(*c*) shows an exemplary dialog box resulting from a request from a user who has previously been rated as untrustworthy (either by this target or by the community in general). His rating is displayed along with a notice that he desires a call.

FIG. 9(*d*) shows an exemplary user interface on a requester's system. In this example, the requester had previously tried to contact Bob, but was unsuccessful. Now Bob has become available. The requester can accept or reject the call with Bob.

FIGS. 9(*e*)-9(*g*) show another exemplary user interface on a user's system, where the user is both a requester and a target for different ones of a plurality of RTMs. The display of FIG. 9(*e*) is preferably displayed on a user's system most of the time. The display shows the status of requests for RTMs that have been sent to or by the user. For example, if the user has been out of the office or otherwise unavailable, RTMs have been queued in his absence. The display includes, for each request, a status of the requester (e.g., in, out, or unknown); an age of the request; the name or identity of the requester, a priority of the request, a reason for the request (if provided by the requester) and information that the system knows about the requester (e.g., telemarketer (93% probability). In the box of FIG. 9(*e*), an incoming call could cause the specified caller to blink and be moved to the top of the display, along with ringing-style sounds. Alternately, the specified caller could pop up in a dialog box allowing confirmation that the call should be accepted.

FIG. 9(*f*) shows a dialog box that preferably is displayed when the user returns to his system and potentially becomes available (as determined by the system or as indicated by the user). This box (which could also include advertising) shows the number of requests for RTMs by the user that are pending, the number of requests for RTMs from other users to the user that are pending, and the number of users (both targets and requesters) that are available, unavailable, and unknown. In the described embodiment, the user may indicate that he wants to 1) become available immediately, taking the top priority pending request for RTM, 2) remain unavailable, or 3) remain unavailable, but decide to conduct some of the pending calls/RTMs. If the user conducts RTMs (makes calls or arranges meetings) he can dial these himself or he can let the system dial. As mentioned above, the user may initiate an RTM when he is the requester or when he is the target, as long as there is mutual availability between the target and requester. Preferably, if the user does not respond to the box in a predefined period of time, a default action configured by the user, such as remaining unavailable, is taken and the box removed.

FIG. 9(*g*) shows a dialog box preferably displayed when the user conducts an RTM (places a call or arranges a meeting). The dialog box shows one or more of the following, although it will be understood that other information or less information could also be displayed: that the user called (or that the other party called if appropriate); the call duration, the local time and remote time (e.g., PST and EST); the date of the last call with this user; the total number of calls with this user; the reason for the call (if provided) and other information about the other user from local databases. The dialog box also preferably includes call billing information, a link to the caller's web page, and the status information shown in FIG. 9(*f*) about pending calls.

In addition, the dialog box of FIG. 9(*g*) preferably includes buttons that let the user decide whether to end the call and take the next call (checked only at the end of the call); change the class of the call; end the call and hold calls; rate the caller (e.g., untrustworthy or high priority); is change the type identifier of the call; configure special parameters for the user or the call; customization of the look and feel of the interface or other aspects of the software 112; and phone controls (if connected to a PBX via the CTI standard). The dialog box also preferably displays a picture of the caller.

FIG. 9(h) shows an exemplary dialog box that enables the user to inform the system when he has completed a call using a telephone. The user is preferably also prompted with information to help place the call.

FIG. 9(i) shows an exemplary dialog box that might occur when placing an Internet telephony telephone call directly from the computer without using the telephone.

The following paragraphs provide additional information about the above-described embodiments and additional embodiments of the present invention.

Call-Waiting

Not only can trusted people get through when the user is holding calls, they can even get through when he is on the phone (see for example FIGS. 9(a)-9(c)). This embodiment tells the user who the caller is, and allows in most cases a quick text message or reply, similar to instant messaging, implementation of which is known to persons skilled in the art. In at least one embodiment, no beep sounds and thus, a person on the other end of the phone during a currently occurring telephone call does not know that another call is available to the user.

Not Just Phone Calls

The described embodiment can also schedule face to face meetings in larger organizations, when two or more people are ready to meet, and want to do it as soon as all of them are in the office and free for a meeting. The embodiment notices this and gives them all a message to attend the meeting.

IP Telephony

If the user wants to use IP telephony (particularly over corporate intranets where it can work reliably, but also over WANs), the described embodiment knows whether both parties have such equipment, what quality of equipment they have, and whether they desire to use the equipment, and can arrange such a call. In some embodiments, it can actually make the call.

Netmeeting and Videophones

The described embodiment's database knows whether both parties have things like Microsoft Netmeeting or other data collaboration tools, and in particular if they both can send and/or receive video phone calls. If so, it can call Netmeeting for a shared whiteboard and other shared applications, and initiate a video call either on its own or to go with an ordinary phone call. Currently, nobody uses video phone calls because it is too much work to know if the other person has the equipment and set up the two ends simultaneously. The described embodiment can let the computer worry about all this.

Out of the Office

In certain embodiments, paying customers could get a remote, touch-tone interface, so that they can declare themselves available to be called at a remote number. Instructions can be left as audio files. With voice recognition or touchtones, more complex directions could be given. Depending on how much they are trusted, users could also be led through the "try and find you" chain. The described embodiment could also control such systems, attempting to find the user and remembering when the user is located.

Privacy

Certain embodiments provide mechanisms to control the flow of personal information (such as when a user is in a specific place, such as at the phone.) Some parties will receive live updates of this information, some will not. Other embodiments allow the user to configure how much information can be sent to particular other users and when. For example, unknown other users would be classed as strangers, but some users might be classed as co-workers, family members or "intimates" of various levels. Such intimates would receive messages about the changes in status of the user regardless of whether they initiated the call request or the user did. Some intimates might even be able to query status before making a call request.

Normally strangers requesting calls would not be given information on the target's real time availability. Instead, they would send the target their own availability information, and let the target's system decide if the parties are now mutually available. Some embodiments will provide an interface for users to easily change the properties of callers and targets, particularly when a call/RTM is pending. Certain embodiments require a requester to provide a password before the target system will accept a request for an RTM.

Mistakes

Software 112 will make occasional mistakes about a user's availability. In a system that automatically determines availability, for example, if the user leaves his desk, it will take it a few minutes before the system decides that the user is gone and no longer available for calls. A few such calls will get through, but the other user can always call back.

From time to time, for people not on trusted lists, there will be race conditions, where A approves the call of B at the same time B is setting up a call with C. Reasonable system response times will cut any time wasted by this to a minimum.

Embedding

Preferably, software 112 is embedded in the screen-saver information-push tools, such as Pointcast, Backweb, Wayfarer, Netcaster, Netmeeting, and Active Desktop. Preferably, software 112 is also integrated with computer telephony systems, so everything is controlled by one system.

Call Centers

Call centers for customer support can use the present invention. Instead of keeping users on costly 800 number hold, the users could request RTMs intermediated by the user with the call center personnel. As soon as a customer rep was available at the call center and the user needing help was also available, the call would be placed.

Call centers, thus, market or distribute the basic client software 112 to their own customers. Imagine the hold music at major companies saying, "Tired of waiting on hold? We don't want to make you wait. Download our client today and we'll call you when it's convenient for you."

Please Hold

Indeed, the present invention might eliminate the words "Please Hold" from the vocabulary at least for long-term holds. Instead, the requester would make his request for an RTM, disconnect and re-connect when both parties are ready. This use is especially effective with new phone methods like ISDN and IP telephony that have very low (under 1 second) call dialing and connection times. Integration with call center systems, and PBX computers can make the process almost invisible to users of those systems.

Components of a Real-Time Multimedia Meeting (RTMM) Facilitation System

An RTMM is typically a telephone call, but may be a real life meeting, video-call or a digitally intermediated meeting (chat, shared whiteboard) or any mixture of the above.

a) A collection of recordings of the desire for one user of the system to have a one-time RTMM with one or more other users of the system. This collection may be centralized, or stored with "client" components of the system associated with the users, or a mixture of these.

b) Metrics to determine whether a given user of the system is ready and available for an RTMM, or an RTMM with specific other parties. These can include both direct input of desires or other status by the user to a software system, data gathered by observation of activity on the user's computer system, telephone or other electronic tools in the possession of the user, or data gathered from transducers associated with the user, measuring such things as sound, the presence of lights, the presence of weight on the floor or in a chair, or motion or physical presence as detected by motion sensors or cameras. The use of the system itself to arrange RTMMs also provides such a metric.

c) A central server to which these metrics are communicated, particularly when they change, so that the server can compute when all the parties to a desired RTMM are present, available and willing, and initiate the RTMM.

Alternately an ability for local clients to connect directly with the systems of other users to communicate the metrics, compute whether the time is right for a call and initiate the RTMM.

d) Systems to initiate an RTMM, either by informing users it is now appropriate to make a specific telephone call or RTMM initiation (and possibly providing information on how to make the call), or actually initiating the RTMM through media such as computer-controlled phone dialers, computer controlled telephony, computer based telephony, or computer based or controlled digitally intermediated meetings.

e) Systems to detect the end of an RTMM, either with metrics or input from the user, to alter the availability status of the users. In addition, upon successful creation of an RTMM, the recorded request for the RTMM is marked as having been acted upon, and is removed from or no longer active in the database.

f) Systems to allow users to exercise control over their availability for an RTMM with different other users or classes of users, and to optionally confirm desires before meetings are initiated.

g) Systems to record preferences of users regarding who should initiate and/or pay for manually set-up RTMMs and other policy matters, and to broker these decisions, as well as preferences for types and times of meetings to broker these decisions as well.

Some Example of Certain Preferred Embodiments

Alice (A) wishes to call Bob (B), but B is not available. When they are both simultaneously available (and don't have a higher priority call pending), different things may happen, depending on their relationship.

a) A and B are close associates

A is informed, and the call is initiated, normally by A. B's computer does display that the call is coming, but may not know about it until the phone rings.

b) Two less close associates:

B is informed of A's desire to call. B either confirms and the call is initiated. If A is to call, A will be informed B is available and will place the call. Otherwise B calls, and A may not know about it until the phone rings. A may also indicate she is not ready, and delay the call. B is informed of this briefly and the call waits for A to reverse this.

c) A and B are strangers

B is informed of A's desire. B may elect to delay the call, in which case A is not informed until B reverses this. B may refuse the call request, in which case A is informed, and perhaps gets a message stating the reason, or a suggestion about what to do to get accepted.

d) B may also discard the call, which means as far as A is concerned the call remains active until some "expire" time set by A, when unfulfilled calls vanish. A will probably figure it out.

e) A is a type of caller (phone solicitor) that B does not take calls from.

A is told immediately that the call is not accepted, but warned that misrepresentation may cause revocation of the right to make calls or requests f) A declares the call to be urgent If A is the sort of caller who can make such a declaration, B will be informed, on screen, of the call even if not totally available (i.e. in a call or meeting, or screen saver is active)

g) A is very close to B

If A is family or some other close relationship, A may be able to access information on B's status, for example how long it has been since B was available, whether B is in a call and perhaps even whom B is talking to.

Who Pays for the Call?

This preferably is determined by several factors:

Who wanted the call?

All other things being equal, the person who wanted to originate the call would dial the call and pay for it.

Additional Details

A user might also have his computer screen calls and let in only the calls it has queued for him, either with caller-id or asking user to enter a couple of touchtones (they were given them when their computer ok'd that it was time for the call).

Computer Intercepts Incoming Calls

The user's computer (presumably via voice capable modem) intercepts incoming calls. Delivers voice message, waits for touch tone codes.

a) If currently about to make call:

Indicate this, ask to queue, provide code for urgent override (Detect caller-ID of expected call just in case).

b) If currently expecting a particular call

Indicate this, ask to enter code number for that call, or user caller-ID to identify user. Otherwise request caller hang up and queue their own call now or later. Allow urgent over-ride.

c) If not currently expecting or making call

Explain The described embodiment system. Accept permanent access codes or caller ID of known parties if available to them, and put such calls through. Otherwise tell caller how to queue a call.

d) If caller doesn't have computer, allow queue via touch tone, or assist in screening call.

Finding a Server After Entering ID of Party the User Wishes to Call

If the local (optional) server is known from name, the system attempts to contact it. It does a DNS lookup to find codes for secondary servers, and attempts to contact them. It contacts a master server for information on what server to contact. Any server preferably can redirect attempt to another server.

For Meetings Instead of Calls

Simply send instructions to all parties to meeting that it is time to meet, rather than initiating call Multi-Party Calls Await availability of all parties or all key parties plus some fraction of secondary parties. Then initiate meeting or conference call.

Forward-On-Busy Call Forwarding

Second number receives call and uses caller-id info and other call screening techniques to duplicate screening process. This function may be at a central server rather than facility run by the user. An Emergency code can cause computer to inform user of emergency call.

Call Initiation Types

System knows what sort of equipment each end of the call has, and the current situation of each party. These parameters affect how the call is actually brought about. The parties confirm initiation or accept automatic initiation based on preferences and per-caller/callee preferences. While computer dialing is preferred if available, the user may elect to use manual dialing. If computer reception in place, automatic dial handles it automatically).

Computer Reception vs. Personal Reception vs. Receptionist

A party may answer own phone, or have computer device answer the phone as described above. A human or electronic receptionist may also screen call and know when to forward to receiving party. IN a similar way, the system knows the preferences of its user and uses one of an ordinary analog phone, digital (voice over IP etc.), or video.**

Both Parties Call Central "Conference" System.

If both parties are unable to easily make non-800 calls or place calls at all without great expense, a central hub may be used. This hub may have 800 numbers for the two or more parties to call (a traditional conference call center) or may be able to call the parties, if billing arrangements are possible. Example—overseas locations where calls to USA are expensive but calls from USA are much cheaper. A central system calls both parties (or all parties) and connects them.

Pager

Pager number or e-mail address is made available. A call is initiated by paging/requesting party who then calls other party or call center.

Call Center Version

Unlike single system, calls can be directed at a pool of several possible recipients. First available recipient handles call, removed from queue immediately so that others will not handle it. Ability to receive availability/scheduling information for the call center staff from call center's own computer systems. Additional priority factors—customer service level, time spent on hold etc. Callers actually on hold intermixed with queued calls.

General Comments a) The basic implementation of software 112 involves messages. Each system, both servers and clients and sub-servers, would normally wait for events, and then act on them. Events would include making a request to queue an RTM/request, and changes in the availability of a calling or called party. Events also include changes in information that determine the availability, and of course all the events of a call—attempting connection, re-confirming availability, making the connection (ie. live audio or meeting) and then closing down the connection.

However, it may be necessary in some cases to "poll" for status rather than simply accepting events that change status. For example, if Internet filters, proxies, or firewalls make receiving incoming messages impossible, a client may have to poll every few minutes to check status. (This is quite common in Internet "push" clients.)

one embodiment involves two software clients, which talk directly to one another once they have figured out where they are on the Internet. However, in practice, intermediate servers can be used for the following purposes:

a) To map a human name or phone number to the current Internet address for the person to be called.
 b) To deal with changing Internet addresses (due to DHCP dynamic host configuration) or to deal with shared Internet addresses, as when network address translation is used.
 c) To broker status and connections between strangers
 d) To record records on users, ie. so that one user may brand the other a liar if they called with a false opening message
 e) e) To proxy connections to users behind firewalls.
 f) To allow polling by users behind such firewalls
 g) To receive advertising control information on the free client.

In certain embodiments, servers would include the "main" servers run by a central company, and proxy servers run by corporates who buy that software. Generally calls between strangers (two people who have never called one another) would start through a central server. Once parties know one another, it may be possible to call without the central server if they have static network addresses. If they have a dynamic or not permanently connected address, they may need to use a central server.

A call can still be rejected even when both parties are generally available. This is to protect the users' privacy. If a stranger calls a user, the stranger doesn't normally find out whether the user is available or not. Rather, the user can see whether the stranger is in or not (the strangers send the user a status change message) and then when the stranger is available and the user is ready for a call, the call gets made. On the other hand, a user may have an accidental signal of availability or unavailability, and want to reverse it. In this case, the user's system sends out availability and the called party sends back its time for a call. At that time the user may decide to abort. If the user decides to abort often, it gets noticed by other users and affects their rating, much like a person constantly ringing your phone when you are not in who leaves caller-id records.

As noted, the technology while focused on the telephone call really arranges any sort of real-time "meeting." That includes face to face meetings. I.e., A user can request a meeting with his boss. When both are available, both systems notify the parties.

In certain embodiments, when a software client is initialized, it checks in with its server. There it can find out if there is a new client update available for the user, and download any new ad information. The client's basic state as being "up" is recorded by the server so the server can know to send it events as time goes by. Normally the connection would not be permanent though firewalls may force it in some instances. If the client uses a sub-server, that server is normally in charge of informing the master server about things. One reason to check with a sub-server is that this server will have been receiving state change information on parties for whom the user has queued
calls while the user's client was down. The startup can sync this information if it's available, and update the user's system information.

RTM requests may come in directly, or may come through the server the client is connected to. RTM requests from strangers normally come in this way, to avoid disclosing private information to the stranger. In addition, servers may be used to anonymize communication, ie. both parties talk to the server so neither one (or anybody snooping) gets to see who is talking to whom.

Clients normally tell the central server they are going down (unavailable for future messages until further notice.) However, they will ping every so
often, and a server that doesn't get pings will record the client down. Servers also have backup servers. If they go down, clients know to use the backup servers. When a server comes back up, it signals the servers that were handling its load, and they synchronize data and pass the load back to the server.

The actual sequence of a call is broken down into the following subtypes:

a) A calls non-intimate B, but B is not available. A now regularly informs B of any changes in status. If B's system notices A is available, and B is available, B's system tells A it is time for the call. The systems decide who will actually call, and call is triggered.

b) A calls intimate B. Now A and B both inform the other of any change in status. The newly available caller will, in sending the new status, indicate it wants to start a call, and systems will go into deciding who will call and the call is triggered.

If call is over computer net, it is negotiated there. If the call is over POTS, computer net and POTS net work together. A dialer (not always the same as requester of the call) makes call. This either happens because the Dialer's computer is able to make the call (i.e. a modem or CTI) or the dialer's computer pops up a message saying, "Now dial xxx-xxxx, and ask for Mr. Jones". The Dialed party's system goes into a waiting state. If it controls a modem answering the phone, it waits for the call. The call, when it comes in, will issue touch tones to get through. Other callers who sneak in during this period can get diverted in some fashion (a short message and disconnect). If a user is answering his phone and system can't detect this, one of the users has to click that the call is active (or if they don't click anything after a while, it's assumed to be.) During all this, both callers are unavailable to others except those who can interrupt.

During the call events can still come in and be processed. The only one that is special is the request for interrupt, which can come from intimates who are enabled to do this, or those who declare an emergency. (Such declaration usually must go through central servers so it can be tracked to determine the trustworthiness of the user.) An interrupt doesn't stop the call but does pop up a message saying a caller wishes to interrupt. This may include text from the caller. The user can then accept the interrupt (much like call waiting) or deny it, possibly replying with some text.

A call failure (no answer) indicates the recipient is probably not really available, even though they are signaling this. This will cause their computer to flash (and even speak) a message asking the user to update their status. If the user doesn't respond, they will get marked unavailable. Especially if there are other clues to assist, like along idle time. This leaves a window on the screen to indicate the change when they come back.

When a user is unavailable (for example their screen saver has turned on) then when they return and touch the computer they will be on the path to being available. However, they will not generally be marked available to all immediately. A small window may pop up saying, "Do you wish to be available now" which will let them say yes, no, or click on callers to which they will be available.

However, if they have calls pending from intimates, those intimates may get a message of "pending availability", which they can use to decide if they want to urgently request a call, even before the user had had a chance to look over their call queue.

When One User is Not at a Computer

In at least one embodiment, RTMs (mainly telephone calls) can be made where one of the parties is not at a network-connectable computer, or is not even a user of the system. Users registered in the system who normally use it from their "base" computer may be away from the system but still wish to use it to intermediate telephone calls. (Away from the system it is less likely to use it to arrange meetings.)

This can take place in a variety of ways, among them:

a) The party can, while using a computer, enter a schedule of both availability, and the telephone number at which the user will be reachable. For example, they might specify that for some or all callers, they will be available by at a cellular phone number either at specific times, or all times that they are away from a network connected computer. They might also schedule times to be available at a home number or remote numbers or even hotels.

b) The party might reach a general computer which has a web browser, and, using an access code, use general web pages associated with either central or proxy servers or their client to change and update their status and schedule and phone number. An "applet", using the Java system, might well provide them with much of the interface they are used to, even at a remote computer.

c) The party might call into to their own computer (if it answers the phone) or a central server. Once called in they could, through the use of touch-tones or voice recognition, give commands to alter their status and location for some or all other parties. If possible, they might do this simply, communicating the phone number they are at through the use of Caller-ID or Automatic Number Identification (ANI) to an 800 number. In this case, availability would be triggered shortly after hanging up this control call.

If calls are made with other parties who are at network connected computers, the other parties will provide signals to the system, to be sent to whatever system is controlling the user's calls, about when the user starts and ends calls with whom. If the user has a call with another party who is also not at a network connected computer, the system will either have to be told with another call that this call has ended, or simply have to guess. In such circumstances, the use of a central server which calls both parties and connects them has advantages.

When a user calls in to update status with touch tones, they may also be able to hear, with computer generated speech, their pending calls and priorities, and control what order they are performed in. Eventually it is hope that cellular telephones in particular will provide native support for call intermediation using the present invention.

Non-Users (Non-Members):

It is also necessary for telephone calls to take place between users ("members") of the system and non-users. While non-users are encouraged to join the system and run the necessary software, this is not a requirement. Non-users can participate in several ways, among them:

a) The non-user can become a temporary user by visiting a web page, and requesting calls with "member" users. The web page will feature buttons for the non-member to indicate their availability status. This web page, if left on the screen, can be used for this purpose, updating every few minutes using automatic mechanisms.

b) The non-user can download and run an "applet" in a web page using a system like Java. This applet can perform almost all the functions of the regular client, though it will not have access to machine information such as keyboard idle times to determine the non-member's availability.

Users satisfied with this level of control could actually become members through such an applet or full Java application.

c) Non-members, who would call members in the ordinary fashion, may have their call intercepted immediately by the member's client. This client could either pass calls through if the user is available and has no call pending, or it could intercept the call and perform a semi-traditional "voice mail" service to allow the caller to leave a message. This greeting message would probably instruct the caller how to use the system as a non-member or member, by directing the caller to a web page with such information.

The system could also accept touch tone or voice commands from the user to allow the user to enter a phone number or name. Caller-ID or ANI could also be used to extract this information. A call could then be queued in the system requesting the member to call the non-member when the member becomes available. It is also possible that the non-member could, using such inputs, specify times of availability, though the interface for that would be complex for an untrained non-member. (ie. "Enter the number of minutes you will be available at this number, followed by the pound sign.") Of course, as noted, the caller could just leave a message, which the member could access either with a voice-mail style interface or ideally over the computer using their client.

d) The operators of the central server could also offer telephone numbers (800 number or otherwise) for non-members to use in calling the member. These numbers could feature routing of calls to the member if the member is available, or special voice mail functions such as above. In these cases, when the non-member is not at a computer, obviously information about when the non-member is available or not is limited. The system may be forced to work with guesses. However, if wrong guesses are made, and calls fail due to busy signals or no-answers, a member can record the failure to improve the guess on the non-member's availability.

In summary, the described embodiments of applicant's invention allow users to efficiently arrange RTMs, including but not limited to, telephone calls and meetings with a minimum of wasted time and effort. The embodiments described herein are presented as examples only, with the scope of the invention being represented by the following claims.

What is claimed is:

1. A computer-implemented method for the intermediation of real time meetings, comprising:
   receiving an indication by a requester system that a requester (R-A) wants to request a realtime meeting M-A with a target T-A;
   sending to a decider system (D) a request to conduct a real time meeting M-A;
   queuing the request for the meeting M-A by the decider system;
   receiving by the decider system (D) an availability status of T-A;
   receiving by the decider system (D) an availability status of R-A, where a possible availability status includes not available;
   receiving an indication by the requester system that a requester (R-B) wants to request a realtime meeting M-B with target T-B, the meeting M-B to be disjoint in time with the meeting M-A; and such that one of the parties to M-A (R-A or T-A), known as the 'common party' is also the same as one of the parties to M-B (R-B or T-B) and thus there are three distinct parties, the decider D being associated with the common party;
   sending to the decider system (D) a request to conduct a real time meeting M-B;
   queuing the request for the meeting M-B by the decider system, such that requests for at least two distinct meetings, disjoint in time are placed in the queue, so that multiple pending real time meetings for the common party are in the queue at the same time;
   receiving by the decider system (D) an availability status of targer T-B;
   receiving by the decider system (D) an availability status of the requester R-B, where a possible availability status includes not available;
   initiating, by the decider, one of the two meetings M-A and M-B by connenting the common party and the other party to that meeting when the common party and that other party are mutually available; and
   dequeuing the request for a meeting.

2. The method of claim 1, wherein a system of the target T-A is polled to determine the availability of target T-A.

3. The method of claim 1, wherein the system of the target T-A pushes the availability status of target T-A to the decider system.

4. The method of claim 1, wherein a system of a party is polled to determine the party's availability.

5. The method of claim 1, wherein the system of a party pushes the party's availability status to the decider system.

6. The method of claim 1, wherein mutual availability is determined by checking the availability of one of the target/requester pairs T-A/R-A and T-B/R-B.

7. The method of claim 1, wherein a request is sent to a plurality of targets and mutual availability is determined when the requester and one of the plurality of targets is available.

8. The method of claim 1, further comprising displaying the availability status of one of the requesters R-A and R-B on the target system, along with an indication that one of the requesters R-A and R-B has requested a meeting.

9. The method of claim 8, wherein the availability status is one of in, out, and unknown.

10. The method of claim 1, further comprising displaying an availability status of the target T-A on the requester system, along with an indication that the requestor has requested a meeting with the target.

11. The method of claim 10, wherein the availability status is one of in, out, and unknown.

12. The method of claim 1, wherein the decider system a part of the system of the common party for whom it is responsible, and wherein the decider already knows the status of the common party for which it is responsible.

13. The method of claim 1, wherein the decider system chooses to activate one of two real time meetings, where the parties for both meetings are available, based on at least one of:
   ranking information including manual ranking through a user interface presented to the common party;
   priority information provided by either party;
   the order in time in which the requests were made; and
   relationship information about the parties based on party input or past history.

14. The method of claim 1, wherein the decider system chooses to activate one of two real time meetings, where the parties for both meetings are available, based on ranking information including manual ranking through a user interface presented to the common party.

15. The method of claim 1, wherein the decider system chooses to activate one of two real time meetings, where the parties for both meetings are available, based on priority information provided by either party.

16. The method of claim 1, wherein the decider system chooses to activate one of two real time meetings, where the parties for both meetings are available, based on the order in time in which the requests were made.

17. The method of claim 1, wherein the decider system chooses to activate one of two real time meetings, where the parties for both meetings are available, based on relationship information about the parties based on party input or past history.

18. The method of claim 1, wherein a non-common requester R-A or R-B is party to another, distinct meeting request.

19. The method of claim 1, wherein a non-common target is party to another distinct meeting request.

20. The method of claim 1, wherein each of the three systems has requested and has pending requests for two or more real-time meetings in the queue.

21. The method of claim 1, wherein if all parties become available at once, only one of the meetings M-A and M-B will occur immediately and the other meeting will remain queued.

22. The method of claim 1, wherein the common party is the target T-A and T-B.

23. The method of claim 1, wherein the common party is the requestor R-A and R-B and the common party participates in both of the meetings M-A and M-B.

24. the method of claim 1, wherein the target is a specific individual selected by the requestor.

25. The method of claim 1, wherein the target is a specific individual.

26. The method of claim 1, wherein the common party is the requestor R-A and R-B.

27. The method of claim 1, wherein the target is any one of a group of targets.

28. A method comprising:
transmitting or receiving at a computing system a first request for a first real-time meeting between a requestor and a first target, the requestor and the first target being individuals;
storing the first request in a queue on the computing system, the queue including more than one request for a real-time meeting;
determining that the first target is unavailable using the computing system, the determination being based on a first signal received by the computing system from an electronic tool of the first target;
waiting until the first target changes from being unavailable to being available;
when the first target is available, determining if the requester is available based on a second signal received by the computing system;
if the requestor is available, then automatically initiating the first real-time meeting using computing instructions stored on a computer readable medium of the computing system; and
if the requester is unavailable, then waiting until a time the requestor becomes available.

29. The method of claim 28, further comprising:
in response to the requester becoming available, determining if the first target is still available;
if the first target is still available, then initiating the first real-time meeting; and
if the first target is unavailable, then waiting until the first target becomes available.

30. The method of claim 28, further comprising:
transmitting or receiving a second request for a second real-time meeting between the first requester and a second target, the second request being transmitted or received between a time the first request is transmitted or received and a time the first real-time meeting is initiated;
storing the second request in the queue; and
initiating the second real-time meeting prior to the first real-time meeting if the second target becomes available before the first target.

31. The method of claim 28, further comprising;
transmitting or receiving a second request for a second real-time meeting between a second requestor and the first target, the second request being transmitted or received between a time the first request is transmitted or received and a time the first real-time meeting is initiated;
storing the second request in the queue; and
initiating the second real-time meeting prior to the first real-time meeting if the second requester becomes available before the first requester.

32. The method of claim 18, wherein the non-common requester R-A or R-B that is party to another distinct meeting request is a target in that meeting request.

33. The method of claim 1, wherein the requestor R-A changes states from not available to available, while waiting for the realtime meeting M-A.

34. The method of claim 1, wherein the requestor R-A participates in another distinct realtime meeting while waiting for the realtime meeting M-A.

35. The method of claim 1, wherein the requester R-A becomes available when the requestor R-A terminates a call.

36. The method of claim 1, wherein the requester R-A and target T-A are both available when they are both off of the phone.

37. A method comprising:
transmitting or receiving at a computing system a first request for a first real-time meeting between a requestor and a first target, the requestor and the first target being individuals;
determining that the first target is unavailable, using the computing system, the determination being based on a first electronic signal received from the first target;
storing the first request in a queue on the computing system, the queue including more than one request for a real-time meeting;
waiting until the first target changes from being unavailable to being available;
when the first target is available, automatically determining if the requester is available based on a second electronic signal received by the computing system; and
if the requester is unavailable, then waiting until a time the requestor becomes available.

38. The method of claim 28, further comprising:
in response to the requester becoming available, determining if the first target is still available using computing instructions stored on a computer readable medium of the computing system; and
if the first target is unavailable, then waiting until the first target becomes available.

* * * * *